US010032390B2

(12) United States Patent
Spandl et al.

(10) Patent No.: US 10,032,390 B2
(45) Date of Patent: *Jul. 24, 2018

(54) SPRAY PATTERN DEMONSTRATION KIT

(71) Applicant: WINFIELD SOLUTIONS, LLC, Shoreview, MN (US)

(72) Inventors: Eric P. Spandl, Shoreview, MN (US); Mark Ledebuhr, Lansing, MI (US); Ryan Wolf, Sheldon, IA (US)

(73) Assignee: WINFIELD SOLUTIONS, LLC, Shoreview, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/443,770

(22) Filed: Feb. 27, 2017

(65) Prior Publication Data

US 2017/0178542 A1 Jun. 22, 2017

Related U.S. Application Data

(63) Continuation of application No. 14/616,190, filed on Feb. 6, 2015, now Pat. No. 9,620,032.

(60) Provisional application No. 62/012,801, filed on Jun. 16, 2014.

(51) Int. Cl.
*G09B 25/00* (2006.01)
*G09B 25/02* (2006.01)

(52) U.S. Cl.
CPC .................................. *G09B 25/02* (2013.01)

(58) Field of Classification Search
USPC ....... 434/126, 365, 367, 369, 370, 379, 381, 434/382, 389; 73/114.45, 114.46, 114.48
See application file for complete search history.

(56) References Cited

U.S. PATENT DOCUMENTS

| | | | |
|---|---|---|---|
| 2,483,637 | A | 10/1949 | Hawthorne |
| 3,033,026 | A | 5/1962 | Krulish |
| 3,081,623 | A | 3/1963 | Domeisen |
| 3,478,580 | A | 11/1969 | Antkiewicz |
| 5,480,336 | A | 1/1996 | Blanchard |
| 5,753,806 | A | 5/1998 | Ryan, III |
| 6,085,585 | A | 7/2000 | Yu |
| 6,234,002 | B1 | 5/2001 | Sisney |
| 6,561,810 | B1 | 5/2003 | Schellhardt |
| 7,195,042 | B1 | 3/2007 | Hawie |
| 7,469,570 | B2 | 12/2008 | Cooper |
| 7,874,197 | B2 | 1/2011 | Jackson |
| 8,166,807 | B2 | 5/2012 | Greeves |
| 8,464,732 | B2 | 6/2013 | Wong |
| 2010/0330542 | A1 | 12/2010 | Nielsen |
| 2013/0323695 | A1 | 12/2013 | Zboray |

*Primary Examiner* — Kurt Fernstrom
(74) *Attorney, Agent, or Firm* — Dorsey & Whitney LLP

(57) ABSTRACT

The present application relates generally to a demonstration kit for various nozzles. The demonstration kit may include a spray assembly and a control assembly. The spray assembly may include a case having a base and a cover rotatably coupled to the base, a plurality of back wall panels configured to be secured to a sidewall of the base, a boom connected to an interior surface of the case, and one or more nozzles connected to the boom and repositionable along a length of the boom. The control assembly includes at least one pump that when in an operating orientation is fluidly connected to the one or more nozzles and a portable power supply in electrical communication with the at least one pump.

20 Claims, 29 Drawing Sheets

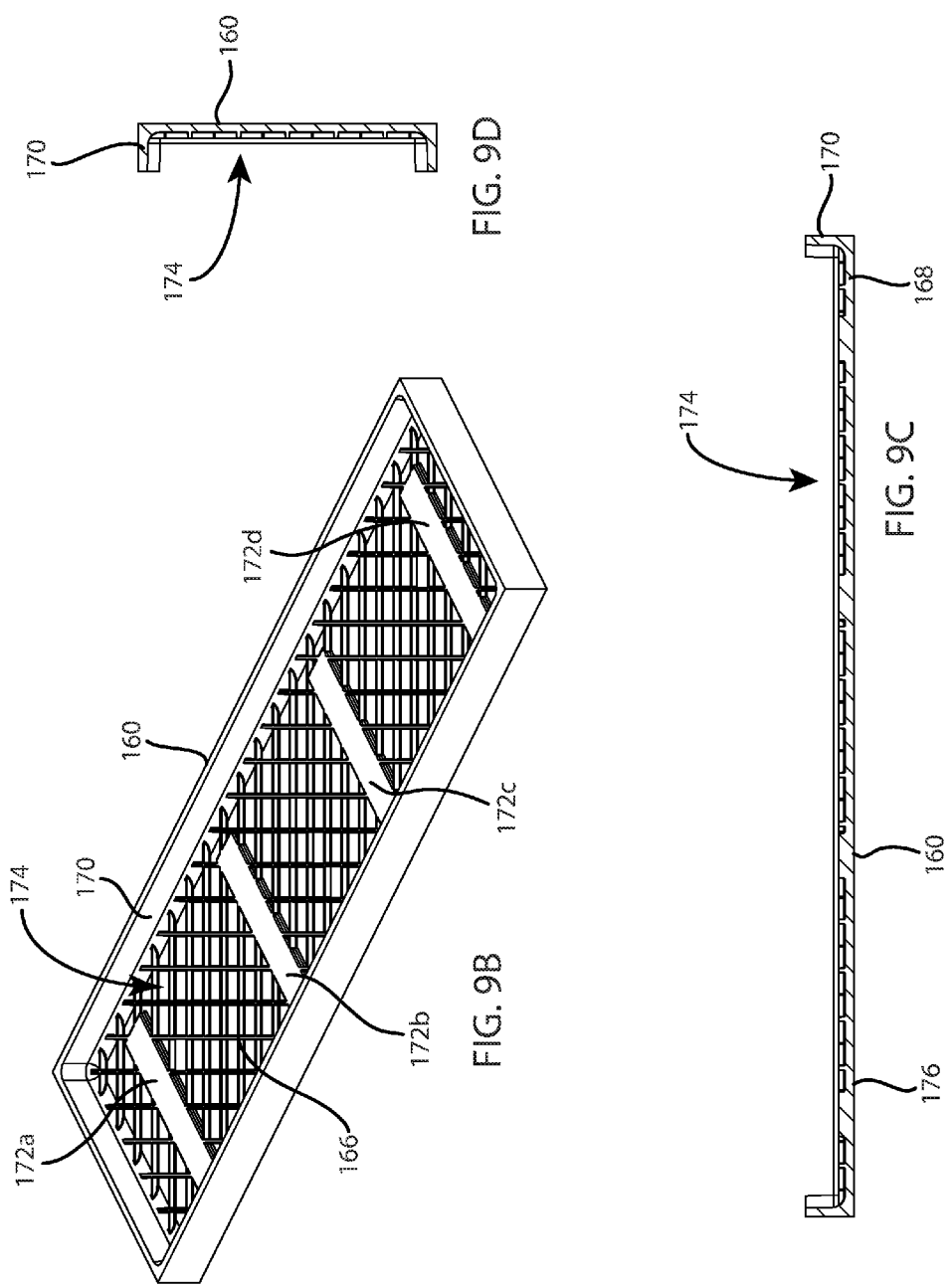

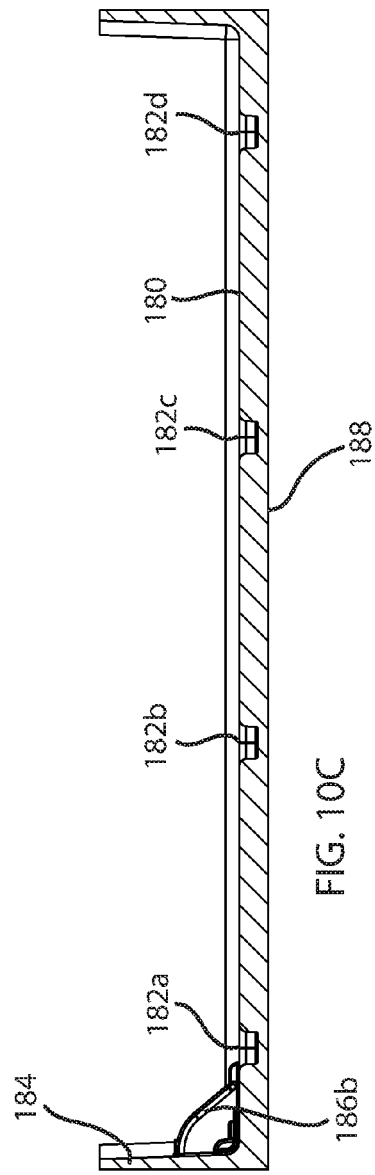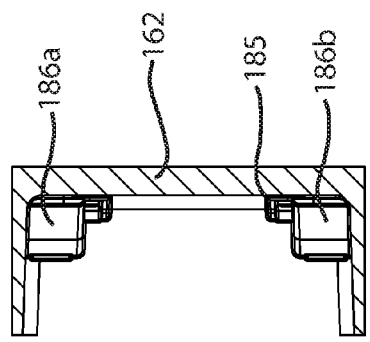

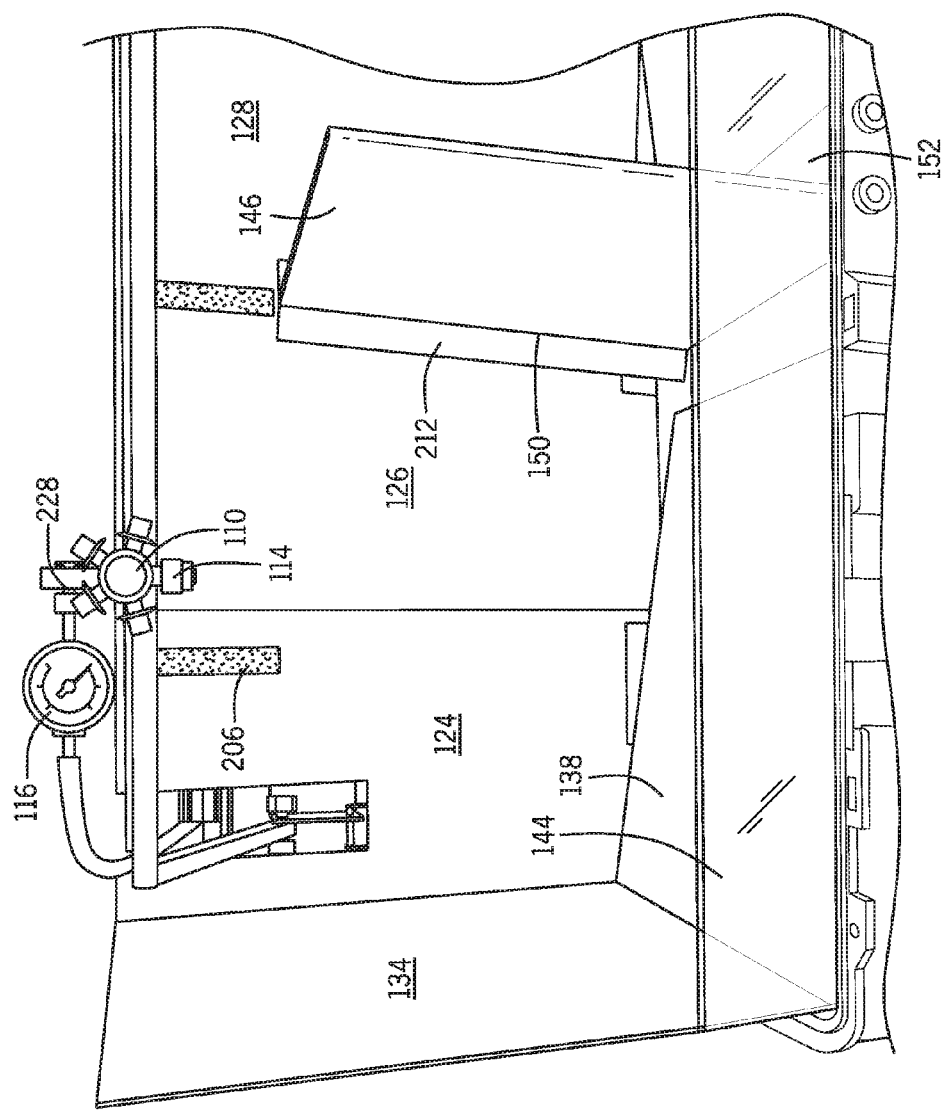

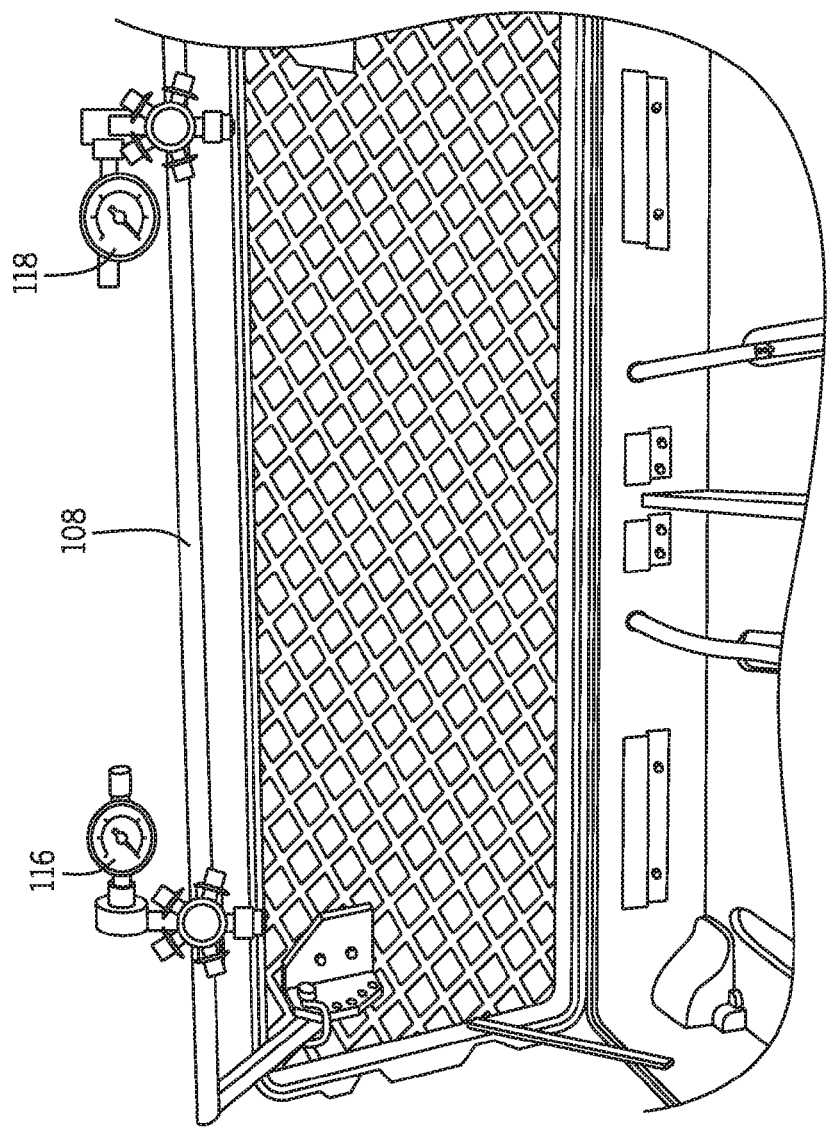

SPRAY PATTERN DEMONSTRATION KIT

CROSS-REFERENCE TO RELATED APPLICATIONS

This application is a continuation of U.S. Ser. No. 14/616,190 filed on Feb. 6, 2015, issued as U.S. Pat. No. 9,620,032 on Apr. 11, 2017, which claims benefit of Provisional Ser. No. 62/012,801 filed Jun. 16, 2014, the contents of all of which are herein incorporated by reference.

FIELD

The present disclosure relates generally to spraying devices, such as nozzles, and more specifically to devices for comparing and demonstrating not only nozzles but also rheologically distinct spray solutions.

DESCRIPTION OF THE RELEVANT ART

The spray characteristics of a nozzle may be varied based on the type of fluid the nozzle is expelling, the flow rate of the fluid, the shape of the nozzle, and other factors. It may be desirable to compare different nozzles during operating conditions. However, to date the need to compare the same nozzle with different types of fluids, or the like, in order to determine what nozzle may be better for a particular application and/or to compare nozzles by different manufactures, etc., has been unfilled. As such, there is a need for a demonstration device that can compare two or more nozzles adjacent one another, and in certain situations, maintain, recirculate, and separate distinct sprayed fluids. Improved control of the device is also desirable. Conventional devices generally rely on manual adjustment of system pressure by manually adjusting fluid bypass valves, which may not be accurate and/or repeatable. Additionally, improvements over the current state of the art to increase the portability, setup, maintenance, and inherent safety of the device may be desirable to improve the usability of the demonstration device.

SUMMARY

Some embodiments of the present disclosure may include a demonstration kit. The demonstration kit may include a spray assembly and a control assembly. The spray assembly may include a case having a base and a cover rotatably coupled to the base, a plurality of back wall panels configured to be secured to a sidewall of the base, a boom connected to an interior surface of the case cover, and one or more nozzles connected to the round boom that are repositionable along a length and radius of the boom. The control assembly may include at least one pump that, when in an operating orientation of the demonstration kit, is fluidly connected to the one or more nozzles and a portable power supply in electrical communication with the at least one pump. In some embodiments the portable power supply operates on intrinsically safe low voltage direct current, typically around 12 volts.

Other aspects, features, and details of the present disclosure can be more completely understood by reference to the following detailed description of a preferred embodiment, taken in conjunction with the drawings and from the appended claims.

BRIEF DESCRIPTION OF THE DRAWINGS

FIG. 9B is a bottom isometric view of the top cover of FIG. 9A.

FIG. 9C is a cross-section view of the top cover of FIG. 9A taken along line 9C-9C in FIG. 9A.

FIG. 9D is a cross-section view of the top cover of FIG. 9A taken alone line 9D-9D in FIG. 9A.

FIG. 10C is a cross-section view of the base of FIG. 10A taken along line 10C-10C in FIG. 10B.

FIG. 10D is a cross-section view of the base of FIG. 10A taken along line 10D-10D in FIG. 10B.

FIG. 11 is an enlarged view of the spray assembly of FIG. 3.

FIG. 18A is a top front isometric view of another example of the demonstration kit.

OVERVIEW

Figure 1:
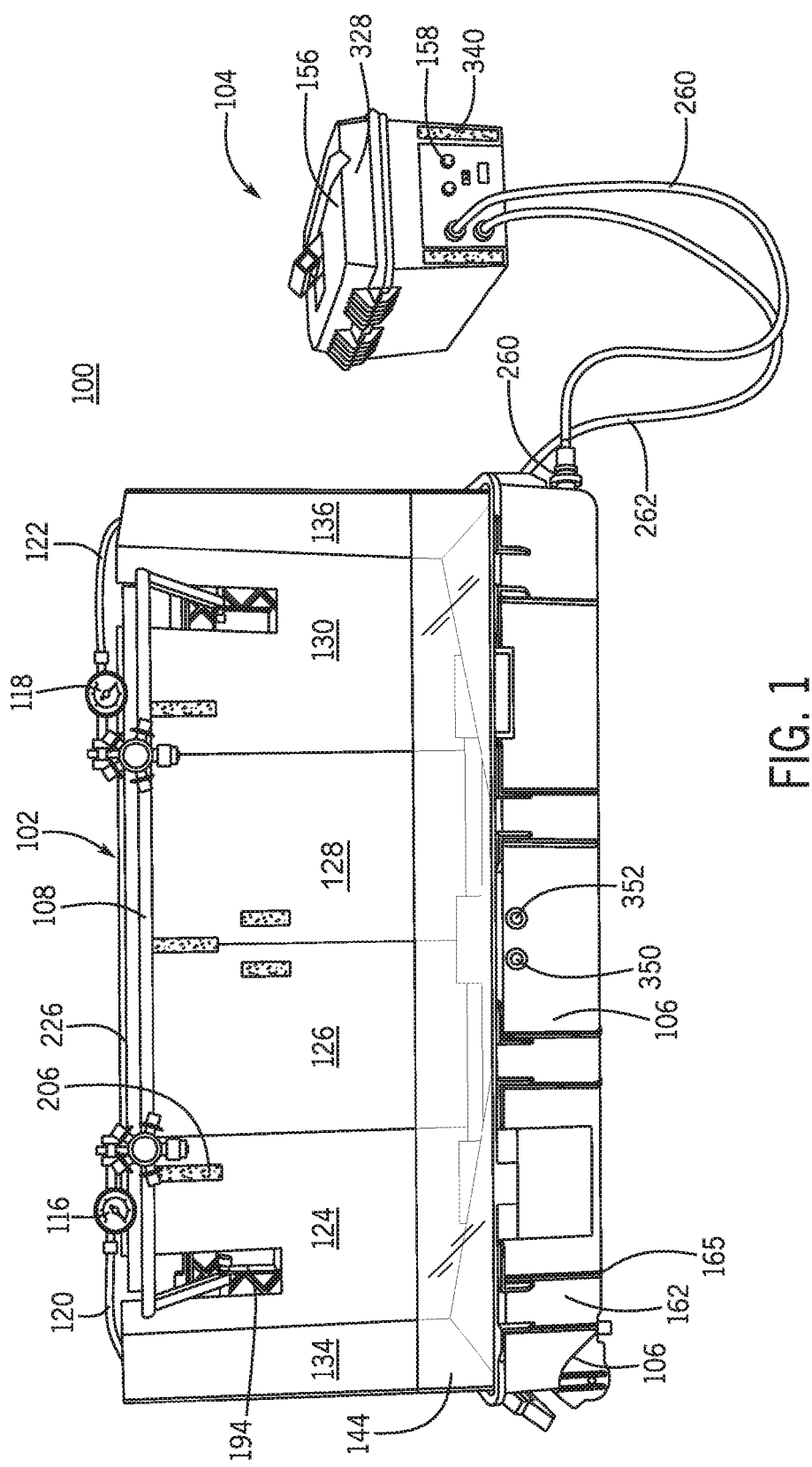
FIG. 1 is a front isometric view of a demonstration kit in an operating orientation.

Embodiments of the present disclosure may take the form of a demonstration kit that can be used to illustrate and compare spray characteristics of one or more application scenarios using variations of any or all of the following variables: nozzle type, fluid pressure, and spray solution. The demonstration kit may be configured such that two or more nozzles may be operated adjacent one another and optionally at the same time. This allows a user to better compare the spray characteristics of the two or more nozzles and/or nozzles with different fluid and/or flow characteristics. Additionally, the demonstration kit may be portable and include a plurality of components that may be folded, disassembled, or otherwise reconfigured in order to fit within a traveling assembly.

In one embodiment, the demonstration kit may include a spray assembly and a control assembly and the two assemblies may be fluidly connected through one or more hoses and quick connect valves. The control assembly includes a power assembly, one or more pumps that pump fluid to nozzle assemblies within the spray assembly, a pulse dampening assembly, and may include one or more control circuits that vary the speed and other operating characteristics of the pump to vary the flow to the nozzles, e.g., through a pulse width modulation signal. The spray assembly structure may include one or more fluid reservoirs, a plurality of nozzles, a boom or other nozzle support structure, and a plurality of sidewall panels. In operation, the control assembly pulls fluid from the fluid reservoir(s) within the spray assembly and pumps the fluid to the nozzle assemblies via a plurality of hoses or tubes. The nozzles then emit the fluid, where the characteristics of the fluid output depend on the nozzle structure, type of fluid in the reservoir, and the pump characteristics varied by the control assembly which the various characteristics may be viewed by one or more users.

The demonstration kit may provide for a plurality of different reservoir configurations. For example, in one configuration, the device may include one or more recirculating reservoirs where fluid in the demonstration kit is circulated via the reservoirs provided a closed loop system, where fluid can be conserved. As another example, in another configuration, the reservoir may be a standalone reservoir separate from the kit or a fluid source (e.g., wall fluid outlet) and the fluid may be disposed of and it is expelled from the nozzles.

In one embodiment, the demonstration kit may include an enclosure or case that supports the spray assembly and/or the control assembly, as well as functions as a reservoir. For example, a bottom portion of the demonstration kit may include drainage areas that are sloped or depressed and a pump intake hose may be positioned within the drainage areas. During use, the bottom portion is positioned to receive fluid from the spray assembly and the fluid then drains to the pump intake to be recirculated. After use, the bottom portion may function as a storage compartment for one or more components.

After use, the components for each the spray assembly and the control assembly may be disassembled and stored within the respective assemblies. This allows the demonstration kit to be portable and easily transported by a single person. Conventional spray demonstration tables are very heavy, not easily portable, and difficult for a single person to transport. On the contrary, the demonstration kit of the present disclosure allows a single person to transport the kit, assemble and use the kit, and disassemble the kit after use. Further, the demonstration kit of the present disclosure may include a portable power supply to operate the pumps, which allows the demonstration kit to have an untethered operation and be used in a variety of locations. The demonstration kit can be assembled and disassembled by hand, i.e., without tools, which makes the demonstration kit also easy to use.

DETAILED DESCRIPTION

Turning now to the figures, a demonstration kit of the present disclosure will be discussed in more detail. FIG. 1 is a front isometric view of a demonstration kit 100. As shown in FIG. 1, the demonstration kit 100 may include a spray assembly 102 and a control assembly 104. Each of the assemblies 102, 104 may include a case or container 106, 156 that is used to support and house the components of the respectively assembly 102, 104 during use and transportation. When in use or in an operating orientation, the spray assembly 102 is fluidly connected to the control assembly 104 through a plurality of hoses 120, 122, quick connect valves, and optionally may be coupled to the control assembly to provide power to one or more components such as a lighting element. It should be noted that although the spray assembly 102 and the control assembly 104 are depicted as two separate components, in other embodiments the features of the control assembly 104 may be incorporated into the spray assembly 102. However, in embodiments where the control assembly 104 is separate from the spray assembly 102, the electronic components within the control assembly 104 may be better protected from fluid damage as they are separated from the fluid reservoir and spraying elements of the spray assembly, as will be discussed in more detail. Additionally, when separated, the two assemblies may be stored in separate locations, which may be desirable based on available storage space.

Spray Assembly

The spray assembly 102 will now be discussed in more detail. FIGS. 2-7 illustrate various views of the spray assembly 102 in an operating orientation. With reference to FIGS. 2-7 the spray assembly 102 may include a case 106 or container having a base 162 and a cover 160 rotatably connected to the base 162. Each of the components of the spray assembly 102 are connected either directly or indirectly to the case 106. The base 162 of the case 106 provides the main support of the spray assembly 102. In one embodiment the case 106 is constructed out of a rigid but somewhat light weight material. In one example, the case 106 is constructed out of plastic; however, many other material types are envisioned. As a specific example, the case 106 may be foam-core injection molded plastic such as the Pelican 1770 sold by Pelican. In another example, the case may be a Fat-Max case sold by Stanley.

Figure 8A:
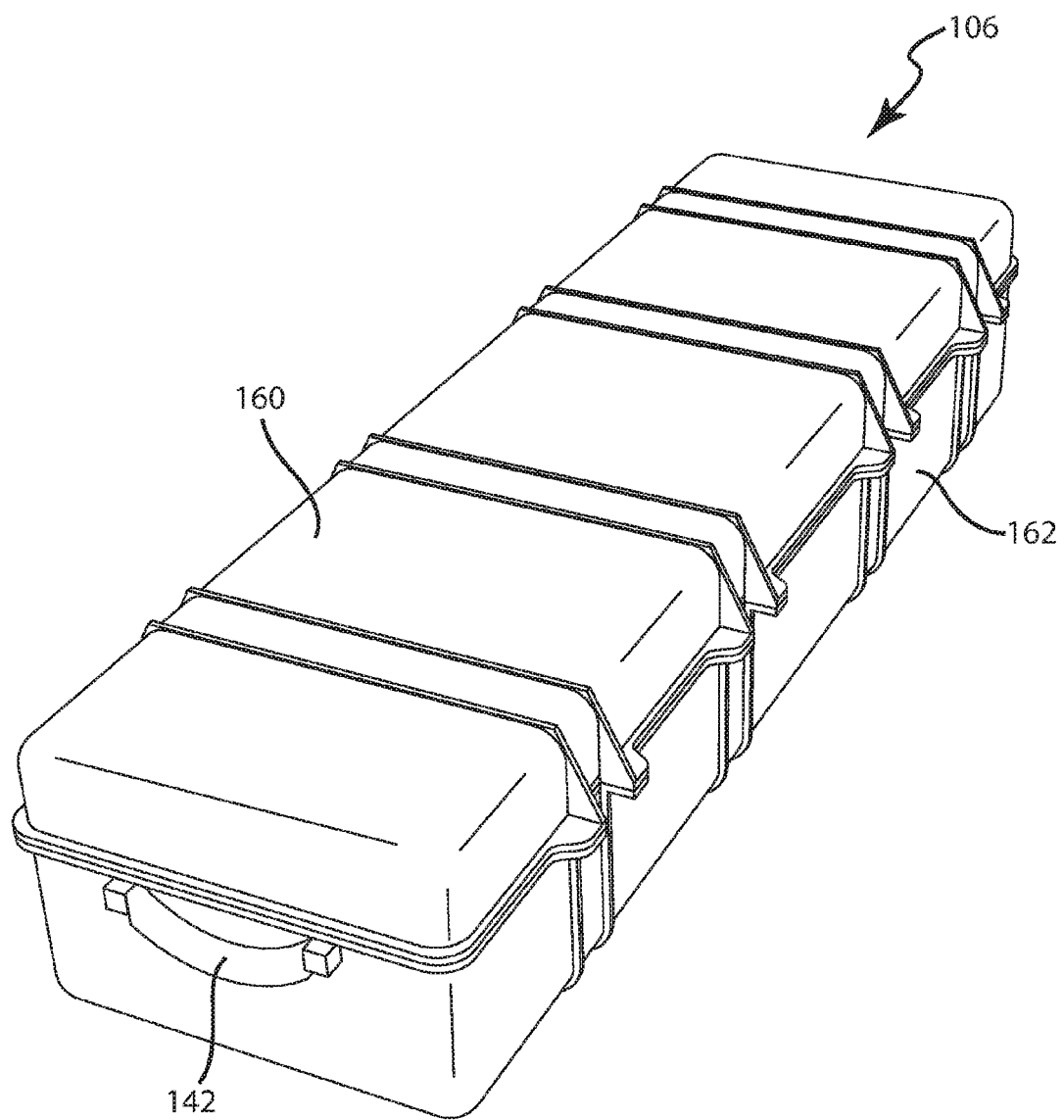
FIG. 8A is a top isometric view of the spray assembly of FIG. 2 in the traveling or compact orientation.
Figure 8B:
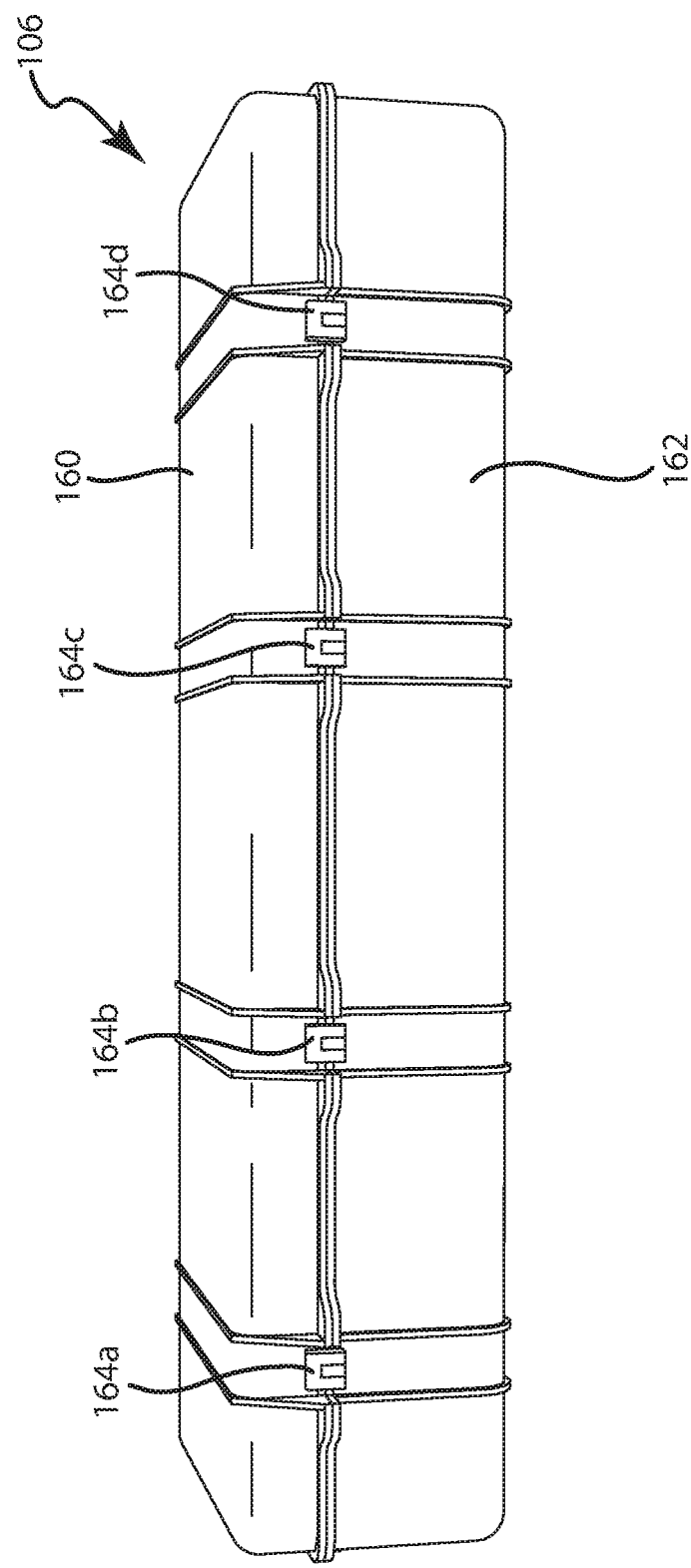
FIG. 8B is a front elevation view of the spray assembly of FIG. 8A.

FIGS. 8A and 8B illustrate the case 106 in the closed position. With reference to FIGS. 8A and 8B, in the closed or transportation orientation, the cover 160 is positioned over the base 162. A plurality of latches 164a-164d may be used to secure the cover 160 to the base 162 and keep the case 106 in the closed position. The case 106 may also include one or more handles. For example, as shown in FIG. 8A a handle 142 is connected to a sidewall of the base 162. It should be noted that the handle 142 may be located at other locations on the base 162 and/or cover 160 and the handle 142 shown in FIG. 8A is meant as illustrative only. For example, the handle 142 may be connected to the top of the cover 160 or front sidewall of the base 162 (see, e.g., the handle for the control case 156).

The cover 160 encloses the base 162 and, as will be discussed in more detail below, provides support for a plurality of components of the spray assembly 102 to orient them above the base 162 in the operation orientation. FIGS. 9A-9D illustrate various views of the cover 160 removed from the case 106. With reference to FIGS. 9A-9D, the cover 160 is generally rectangular shaped and may include an exterior surface 176 and an interior surface 168. A perimeter sidewall 170 extends upwards from an edge of the interior surface 168 to define a cover cavity 174. A plurality of supporting bars 172a-172d extend upwards from the interior surface 168 at discrete locations along the interior surface 168. The support bars 172a-172d provide additional structural support for the cover 160 and may extend across a width or a substantial portion of the width of the cover 160. In one example, the cover 160 may include four support bars 172a-172d spatially separated from each other along the length of the cover 160. However, depending on the material used for the cover 160, the support bars 172a-172b may be increased, reduced, or omitted. For example, the stronger a material may be the fewer support bars may be used.

Figure 9A:
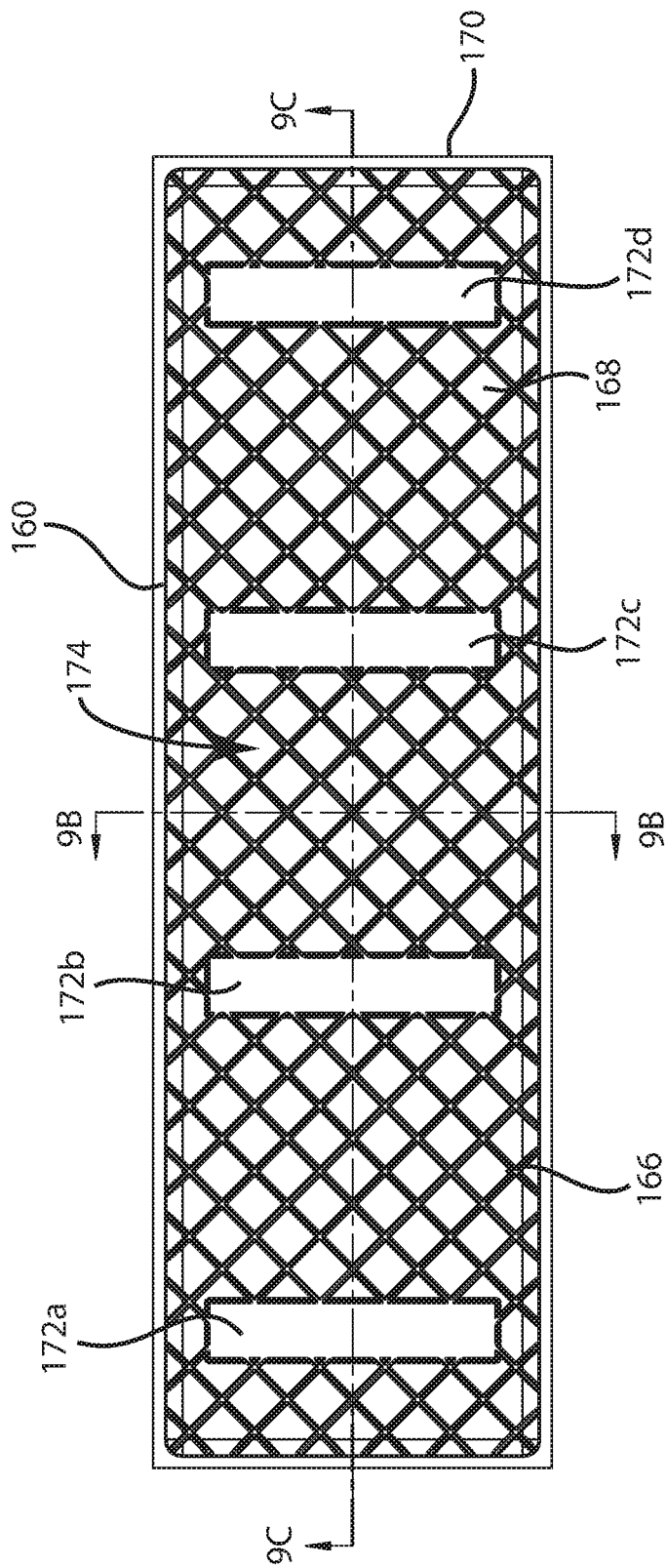
FIG. 9A is a bottom plan view of a top cover for a case for the spray assembly.
Figure 10A:
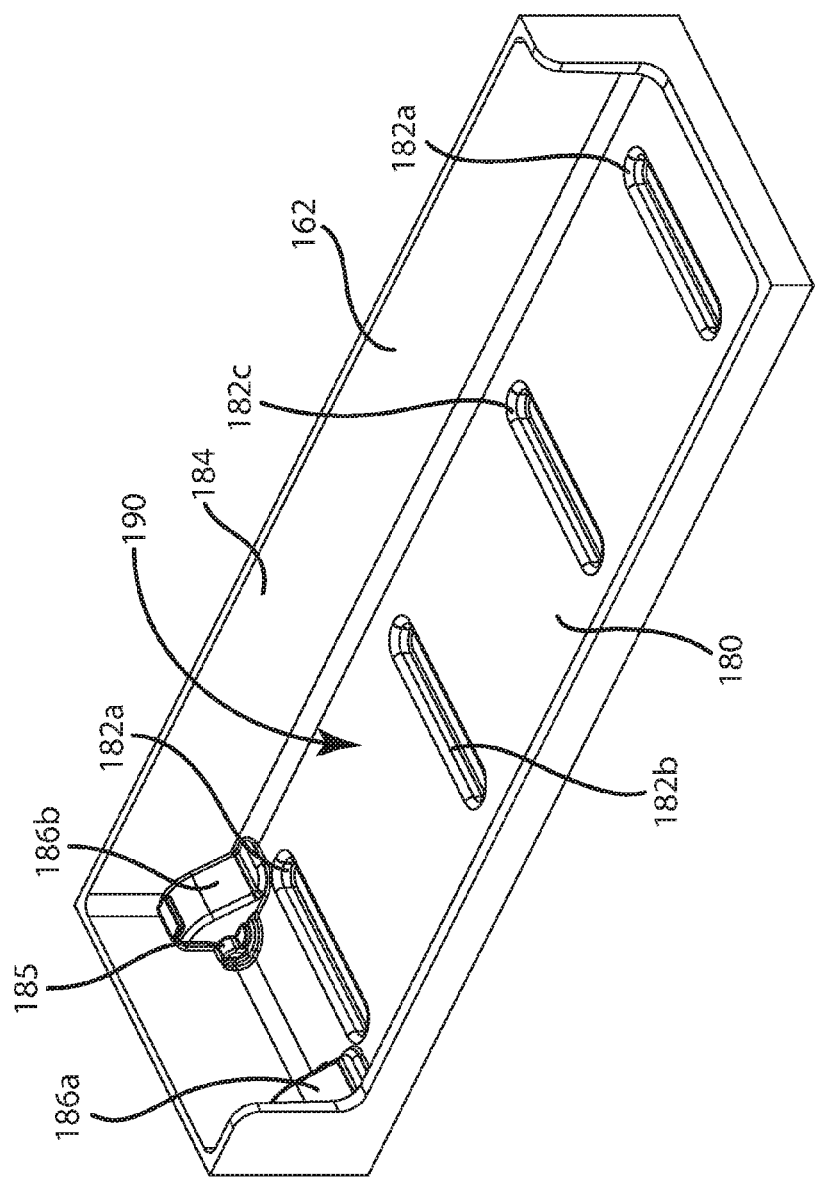
FIG. 10A is a top isometric view of a base for the case of the spray assembly.
Figure 10B:
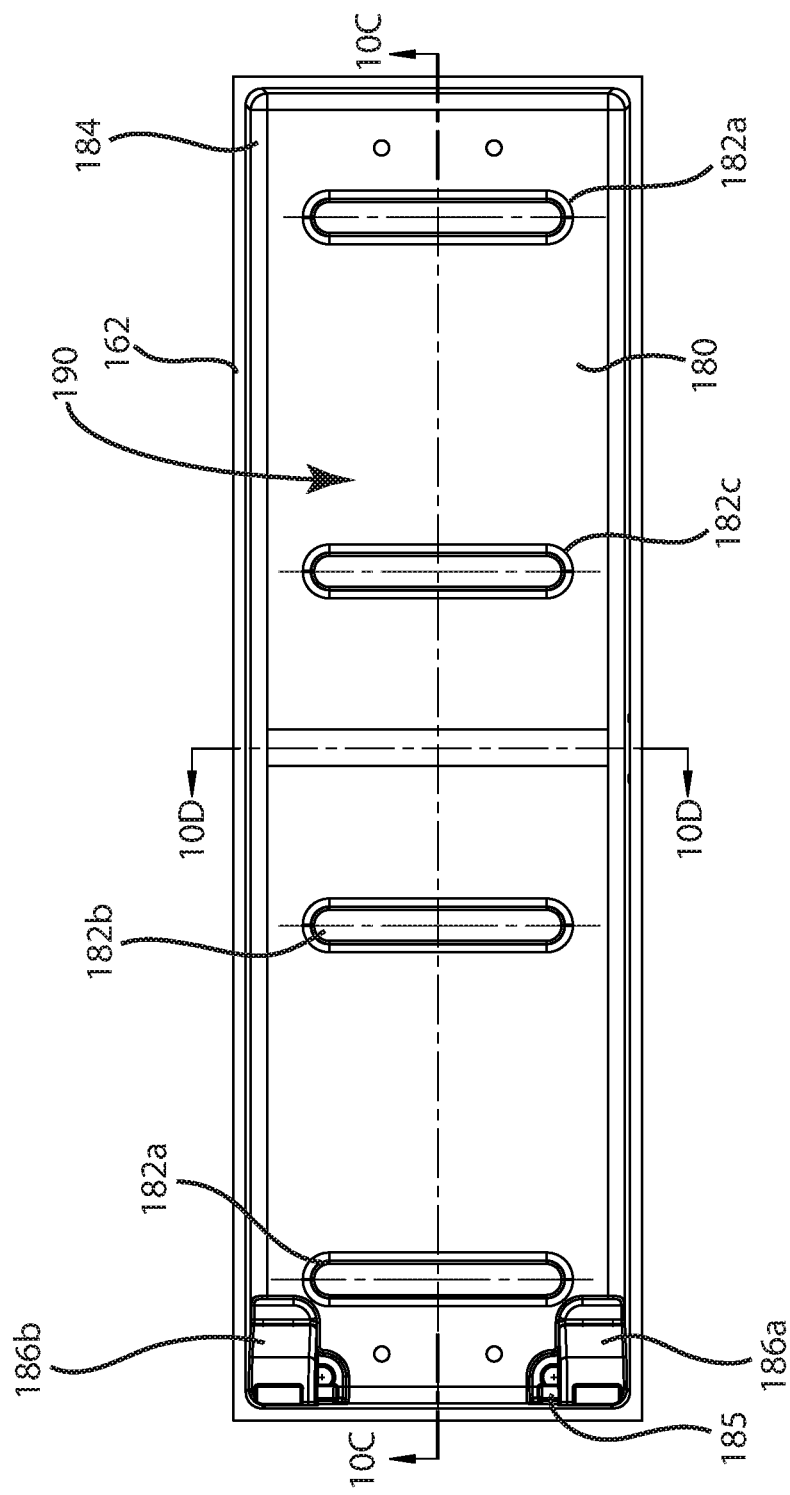
FIG. 10B is a top plan view of the base of FIG. 10A.

With reference to FIGS. 9A and 9B, the cover 160 may also include a strengthening pattern 166 defined on the interior surface 168. In one example, the strengthening pattern may be a honeycomb pattern 166, which similar to the support bars 172a-172d, provides additional strength and rigidity to the cover 160. Additionally, the honeycomb pattern 166 may provide anchoring locations to secure one or more components of the spray assembly 102 to the cover, as will be discussed in more detail. As shown in FIGS. 9A and 9B, the honeycomb pattern 166 may not extend over the support bars 172a-172d. However, in other examples (see FIG. 14), the honeycomb pattern 166 extends over the support bars 172a-172d.

The base 162 will now be discussed in more detail. FIGS. 10A-10D illustrate various views of the base 162. With reference to FIGS. 10A-10D, the base 162 may include a top surface 180 and a bottom surface 188, the bottom surface 188 supports the base 162 on a table, floor, or other structure, the top surface 180 forms an interior surface of the base 162. The base 162 may be constructed of the same material as the cover 160 and similar to the cover 160 may be rigid and somewhat lightweight in order to allow a person to more easily move the spray assembly 102.

Figure 3:
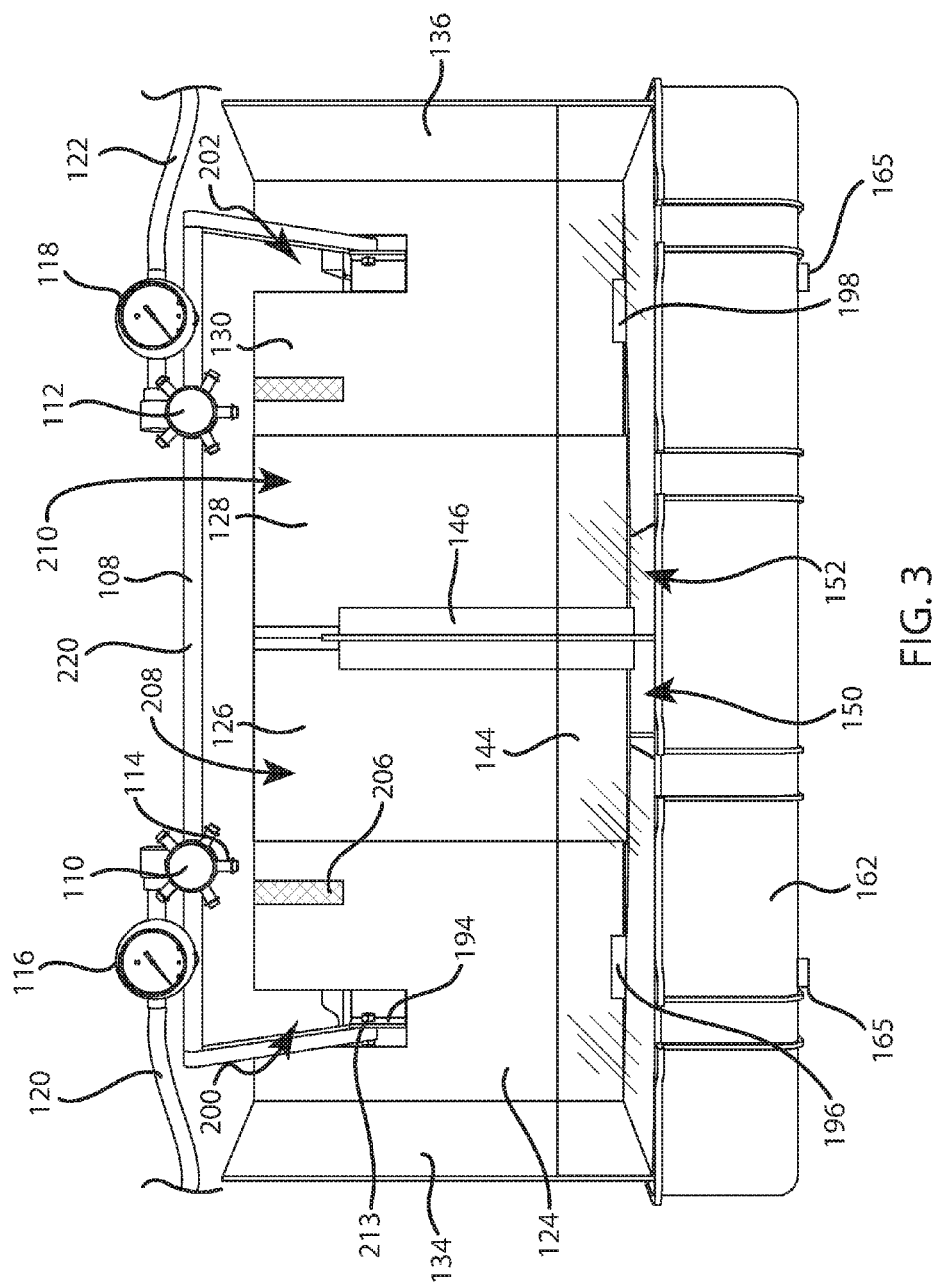
FIG. 3 is a front elevation view of the spray assembly of FIG. 2.

With reference to FIGS. 1 and 3, the base may also be configured to be used with a plurality of support legs 165 that help to balance the base during operation of the spraying assembly 102. The support legs 165 may be extendable and may extend wider than the width of the base to fully support the spray demonstration table when in use. The support legs 165 may be removable from the base or may be integrally formed therewith. Additionally, although two support legs are illustrated, the base may have any number of support legs as desired and the number and structure may be varied based on the configuration of the base.

The base 162 may be configured to substantially match the cover 160 so that when the cover 160 is closed, the cover 160 sidewall 170 aligns with a top surface of a sidewall 184 of the base 162. In some embodiments, the cover 160 seals against the base 162 in the closed position to provide a substantially liquid tight seal. In these embodiments, the demonstration kit may be transported and stored without liquids leaking into or out of the case 106. Additionally, the liquid tight seal may help to prevent any residual spray liquid that may not have drained from leaking out.

The base sidewall 184 extends upwards from the top surface 180 to define the base cavity 190. The sidewall 184 extends around and defines the perimeter of the base 162. In one example, the base has a rectangular shape with two longitudinal sidewalls and two edge sidewalls. The sidewall 184 may be a constant height, but in other embodiments the sidewall 184 may have a varying height. As will be discussed in more detail below, the base cavity 190 may act as a reservoir for the spray assembly 102 to hold and recirculate fluid. The base may also include one or more drain plugs 185 that allow the base to be drained in instances where fluid may spill into the base or when the base itself is used as the reservoir.

The base 162 may further include a plurality of recesses 182a-182d extending across a width of the base 162. The recesses 182a-182d may be spaced apart from one another long the length of the base 162. Additionally, the base 162 may include two wheel wells 186a, 186b on one end. The wheel wells 186a, 186b may define cavities on the bottom surface 188 of the base 162 that are configured to receive wheels to allow the base 162 to be wheeled on a surface. In one embodiment, the wheel wells 186a, 186b extend upwards into the base cavity 190 to provide clearance for the wheels (not shown) connected therein.

With reference again to FIGS. 1-7, the spray assembly 102 may also include a plurality of back wall panels 124, 126, 128, 130 and two sidewall panels 134, 136. The back wall panels 124, 126, 128, 130 and the sidewall panels 134, 136 may be substantially similar to each other, but may vary in dimensions based on each respective location on the base 162 in the operation orientation. The panels 124, 126, 128, 130, 134, 136 are selectively removable from the base 162 and often their width and height may be selected so that they may be positioned within the base cavity 190 during transportation. It should be noted that in some embodiments the panels may be combined with one another and the discrete panels may be formed as folded or creased sections within the larger panel. For example, the two sidewalls 134, 136 may be formed integrally with the two adjacent base panels 124, 130, so that the panels cover the corner of the spray assembly and the folded configuration enhances the rigidity of the panels as will be discussed in more detail below.

The panels 124, 126, 128, 130, 134, 136 may be a lightweight but rigid material. In one example, the 124, 126, 128, 130, 134, 136 are corrugated plastic (such as COROPLAST), which is waterproof, lightweight, and durable. However, in other similar materials may be used as well. Additionally, in some embodiments the panels 124, 126, 128, 130, 134, 136 may be painted or otherwise may be formed of a contrast-enhancing color. As one example, the panels 124, 126, 128, 130, 134, 136 may be painted black or another dark color (e.g., navy blue, purple, etc.) that provides a contrast effect with the fluid emitted by the nozzles of the spray assembly 102. By having a contrasting color, the spray characteristics of the nozzles used with the spray assembly 102 may be more easily observed by a user.

The end back wall panels 124, 130 may include cutouts 200, 202 that extend from a top edge 204 of each panel 124, 130 towards a center of the panels 124, 130. The cutouts 200, 202 may be rectangular shaped and are configured to receive one or more portions of the boom 108 and the boom attachment assembly, as will be discussed in more detail below.

With continued reference to FIGS. 2-7, the back wall panels 124, 126, 128, 130 may include one or more attachment features 206. The attachment features 206 are configured to attach panels to one another and/or to the case and to affix one or more components to the panels. For example, the attachment features 206 may be strips of hook and loop, a plurality of apertures configured to receive corresponding fasteners, protrusions, or the like. The attachment features 206 may be configured to match a corresponding attachment element on components that may be attached to the back walls. For example, the attachment features 206 may be used to attach one or more lights to the back wall to illuminate the spray chambers 208, 210. The varying length of the attachment features allows the lights or other components to be placed at varying heights on the panels.

Figure 5:
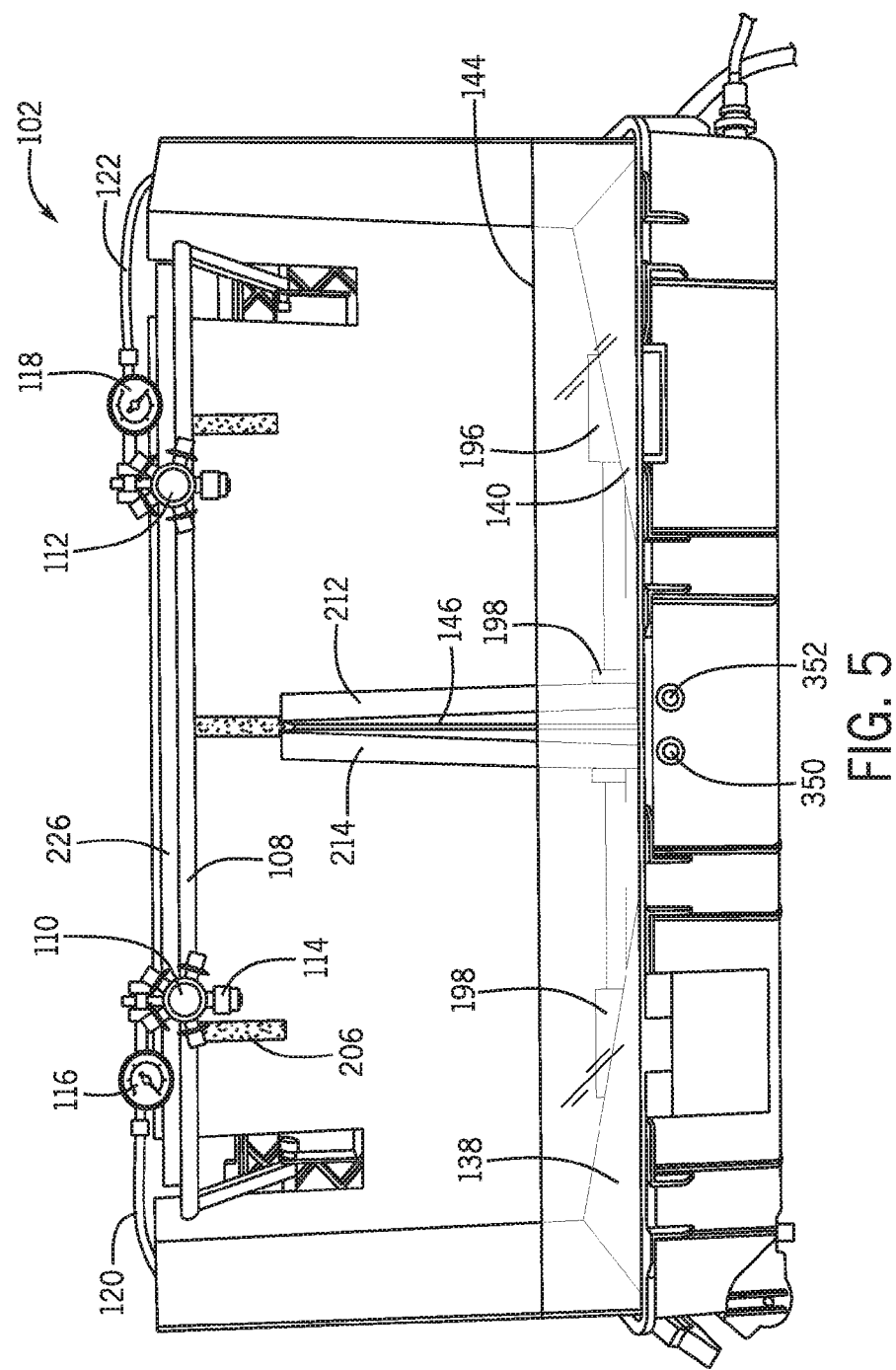
FIG. 5 is another front elevation view of the spray assembly illustrating a lighting element.
Figure 6:
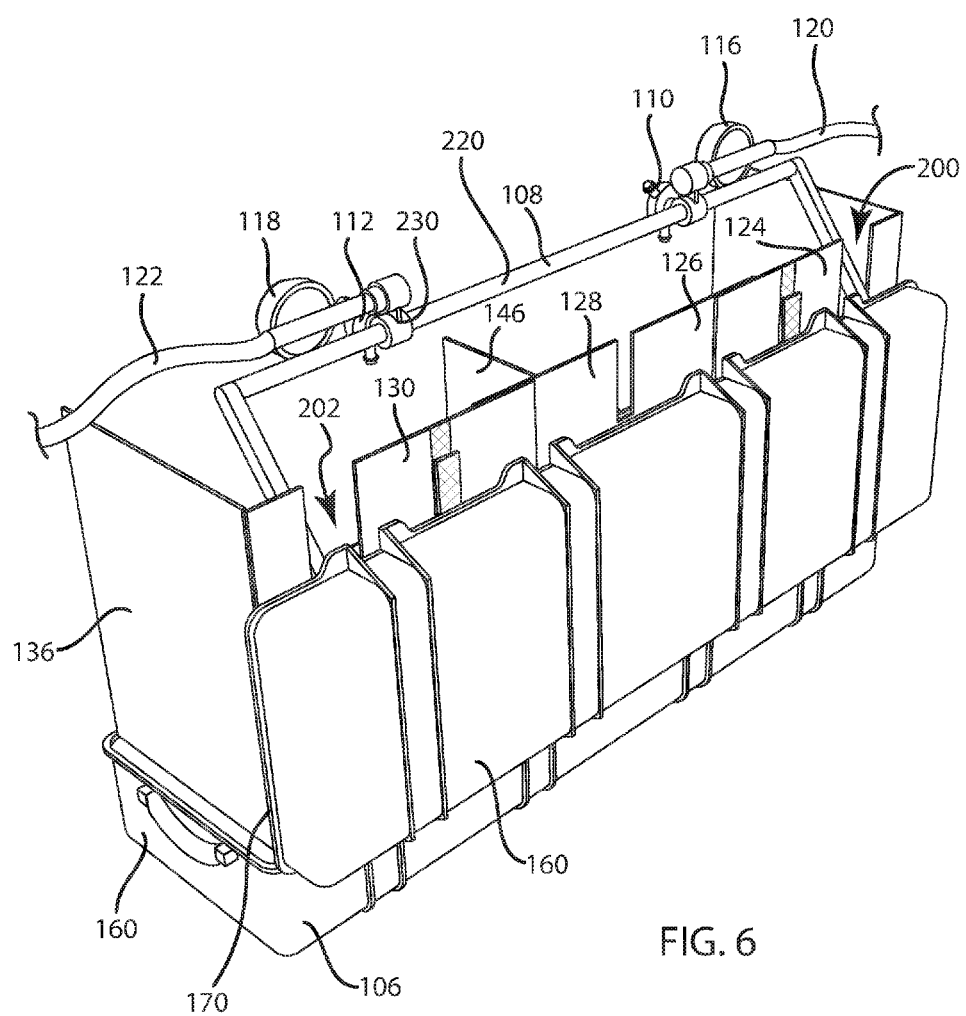
FIG. 6 is a rear isometric view of the spray assembly of FIG. 2.
Figure 7:
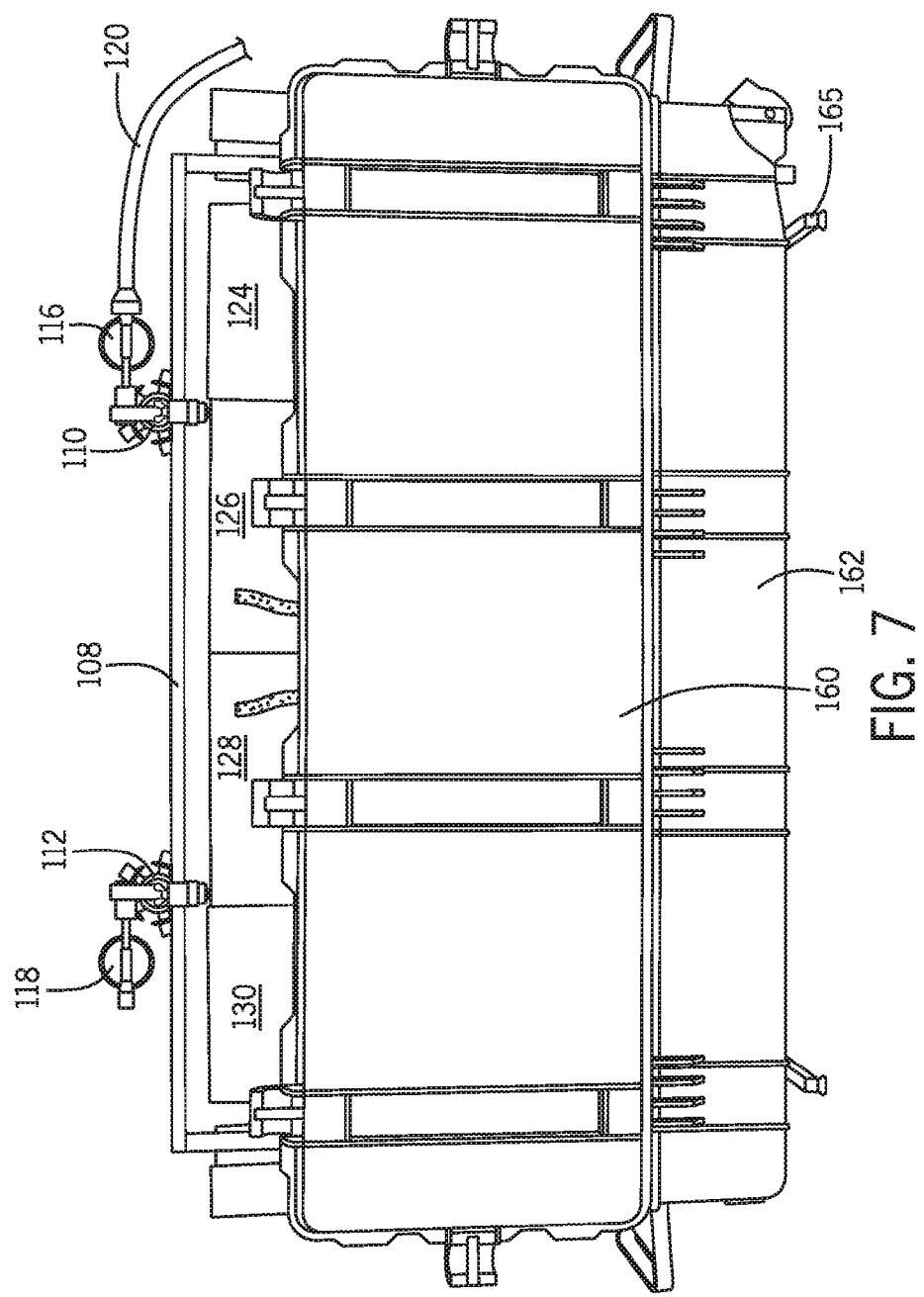
FIG. 7 is a rear elevation view of the spray assembly of FIG. 2.

The spray assembly 102 may also include a dividing wall 146. The dividing wall 146 may be a similar material to the panels 124, 126, 128, 130, 134, 136 or may be a different material. The dividing wall 146 is generally rectangular and may have a lower height than the panels 124, 126, 128, 130, 134, 136. For example, the dividing wall 146 may typically have a lower height to allow the boom 108 to be placed at varying heights without interfering with the dividing wall. With reference to FIG. 5, in one example, the dividing wall 146 may be a folded piece of material where the crease for the fold is oriented outwards away from the cover 160 in the operating orientation. Additionally, the dividing wall 146 may include two tabs 212, 214 that extend outward perpendicular to the extension of the dividing wall 146. In this example, the tabs 212, 214 may be formed integrally with the dividing wall 146. However, in other examples, the tabs 212, 214 may be a separate element connected to a longitudinal edge of the dividing wall 146. Further, the dividing wall 146 may be configured so that the split in the folded edge is sufficiently deep so that each side of the dividing wall 146 can reach the optional recirculation reservoir trays (discussed below), so that the sprayed fluid will impact the dividing wall 146 and flow down the wall 146 to reach the respective reservoir trays.

The spray assembly 102 may also include a splash guard 144. The splash guard 144 may be a transparent or partially transparent material, e.g., clear plastic, glass, or the like, to allow the spray patterns to be viewed through the splash guard 144. The splash guard 144 may have a length that substantially matches the length of the base 162. The height of the splash guard 144 may be substantially less than the panels 124, 126, 128, 130, 134, 136. In one embodiment, the splash guard 144 may have a height that is a quarter or less of the height of the panels 124, 126, 128, 130, 134, 136. The shorter height of the splash guard 144 allows a user to view more of the spray compartments 208, 210 without obstruction. However, the dimensions of the splash guard 144 may be varied as desired.

With continued reference to FIGS. 1-7, the spray assembly 102 may also include a boom 108. The boom 108 is a moveable support structure for the nozzle turrets 110, 112. For example, the boom 108 supports the nozzle turrets 110, 112 in a spray position in the operating orientation of the spray assembly 102 and in a collapsed position in the transportation orientation of the spray assembly. The boom 108 may include a support rod 220 that extends between two arms 222, 224. The support rod 220 may be a generally cylindrical rod that provides an attachment location for the nozzle turrets. The use of a cylindrical rather than square shaped structure allows the nozzle turrets 110, 112 not only to be positioned laterally on 108 but also radially as desired by the operator. In other words, due to the round shape of the rod 220, the nozzle turrets 110, 112 may have two degrees of freedom and may be rotated to at different angles relative to the boom and at different lateral positions along the length of the boom.

The support rod 220 in one embodiment may have a length of approximately 48 inches. The boom 108 may extend substantially the entire length of the cover 160. Additionally, as will be discussed in more detail below, is rotatably coupled to the cover 160 so that it can rotate between a collapsed position and an extended position. Additionally, the boom 108 may be placed at a number of different heights relative to the base 162 in the operating orientation, which allows the height of the nozzle turrets 110, 112 to be selectively varied. It should be noted that although the boom 108 is illustrated as a single member, in other examples, the boom may include two or more components. For example, there may be a separate boom for each nozzle turret. In this example, the demonstration kit 100 may be used to illustrate how the nozzle spray characteristics vary based on height above a target.

With reference to FIG. 5, the spray assembly 102 may also include a lighting element 226. The lighting element 226 emits a light to better illuminate the spraying chambers 208, 210, which allows a user to better view the spray characteristics of the nozzles. In one embodiment, the lighting element 226 is a fluorescent light that extends parallel to the length of the boom 108. However, in other embodiments the light element 226 may be a plurality of lights such as light emitting diodes (LEDs), incandescent lights, compact florescent lights, or the like. In this example, the lighting element 226 may be one or more LEDs and operate at around 12 volts and extend substantially the full length of the container, boom, or to shorter lengths. Further, the lighting element 226 may be sealed to IP67 or better standard (i.e., be waterproof). The use of LEDs may be preferred due to low current draw in relation to light output, which helps to preserve longevity of the direct current power source and for the high and the uniform light output produced by LEDs. Further, LEDs are lightweight and durable with a long service free life consistent with the overall concept. The relatively low operating voltage reduces the risk of severe electrical shock to a user if a fluid or incidental mechanical damage occurs to damage the electrical connection to the lighting element 226.

With reference again to FIGS. 1-7, the spray assembly 102 may also include one or more nozzle turrets 110, 112. In one example, each nozzle turret 110, 112 may include a plurality of nozzles 114 spaced apart from one another. The nozzle turret 110, 112 may be rotated to vary the open nozzle 114, e.g., the nozzle 114 oriented downwards towards the base 162 may be the "open" or active nozzle (i.e., the nozzle fluidly connected to the pumps). In one example, the spray assembly 102 includes two nozzle turrets 110, 112. However, in other examples, the spray assembly 102 may include a single nozzle turret or may include three or more nozzle turrets. The number and positioning of the nozzle turrets 110, 112 may be varied based on the number of nozzles desired to be demonstrated or compared with the demonstration kit 100.

The nozzles 114 may vary in size, shape, material, and other characteristics. Examples of nozzles 114 that may be used include: nozzles manufactured by TeeJet, Hypro, Greenleaf, Wilger, Lechler, including nozzle models such as AIXR, Al, TT, UCD, TJET, and so on. Example flow rates through the nozzles include around 0.0125-2.0 gallons per minute per nozzle. As a specific example, the flow rates range from approximately 0 to 1.8 gallons per minute per nozzle.

Figure 12:
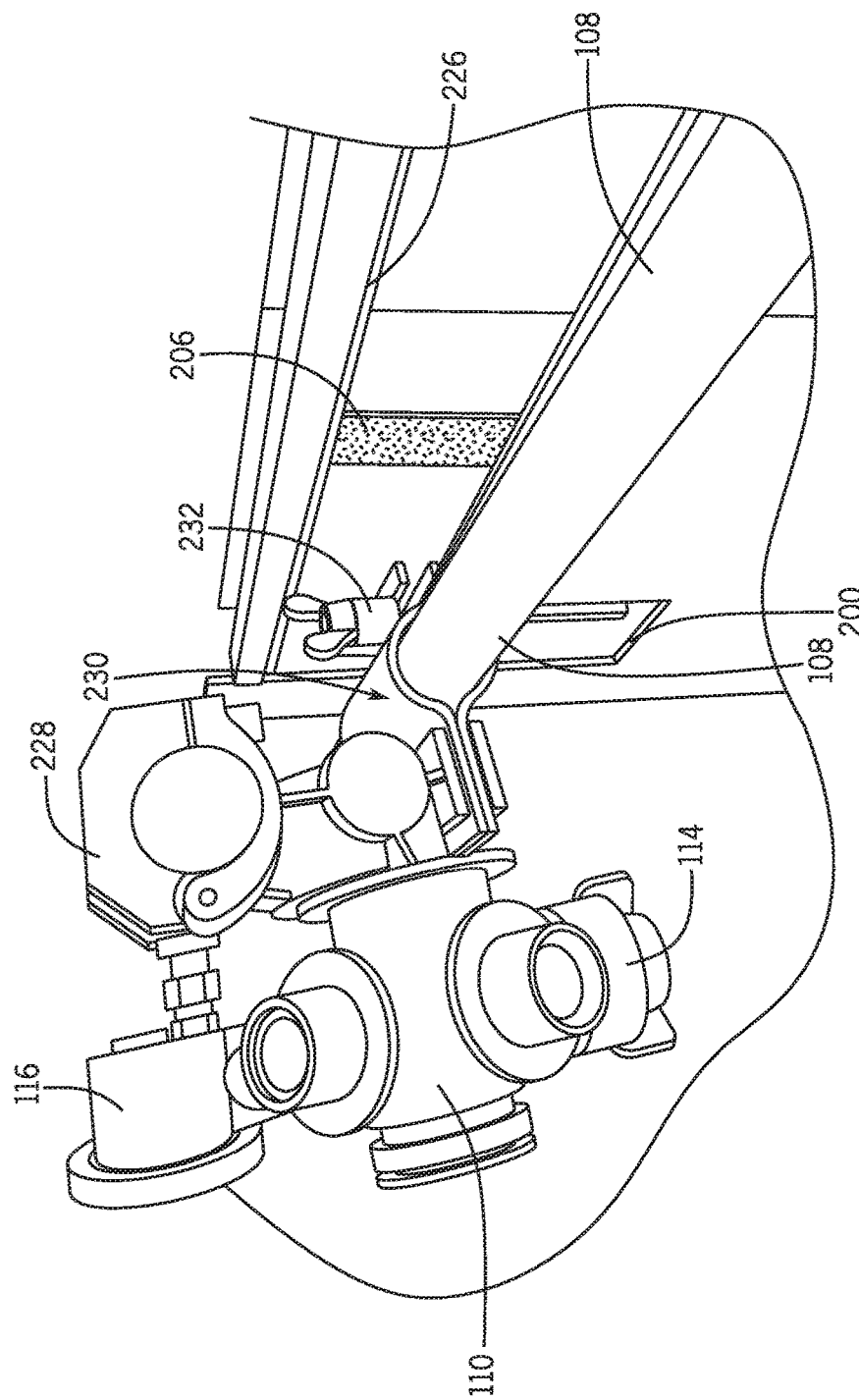
FIG. 12 is another enlarged view of the spray assembly illustrating the nozzle turret and attachment feature.

FIGS. 11 and 12 illustrate enlarged views of the spray assembly 102. With reference to FIGS. 11 and 12, the nozzles 114 on the nozzle turret 110 are spaced radially around a hub of the turret 110. It should be noted that although only a single nozzle turret is shown in FIGS. 11 and 12, the second turret may be substantially the same as the turret shown in FIGS. 11 and 12. The discussion below with respect to the nozzle turret 110 is applicable to the second nozzle turret 112, which may include the same features. Each nozzle 114 is in selective communication with an inlet to the turret 110, where the orientation of the turret 110 determines which nozzle 114 is fluidly connected to the inlet. The nozzle turret 110 may include a hose connecting assembly 228. The hose connecting assembly 228 is configured to fluidly connect the nozzle turret 110 to one of the hoses 120, 122 and/or pressure gauges 116, 118.

Additionally, each nozzle turret 110, 112 may include a boom connection fastener 230. The boom connection fastener 230 allows selective connection of the turret 110, 112 to the boom 108 and may allow the turret 110, 112 to be moved along the length of the support rod 220 and rotated relative thereto. In one example, the boom connection fastener 230 is a clamp structure having two clamping brackets that clamp around a portion of the support rod 220. The clamp structure 230 may be a Spraying Systems Teejet AA111-1/2 that has been modified by the addition of an increased length round head machine screw in combination with a plastic (e.g., nylon) spacer, and wing nut 232 to fit the machine screw. This combination allows repeated manual adjustment without the use of tools.

A wing nut 232 is then used to secure the two clamps around the support rod 220 to secure the nozzle turret 110, 112 in a desired location along the length of the support rod 220. In this example, the wing nut 232 may be loosened to allow the two clamps to disengage from the outer surface of the support rod 220 so that the nozzle turret 110, 112 can be slid along the length of the support rod 220 and rotated around the outer surface of the support rod 220 to be repositioned on the boom 108. The cylindrical interface of the connection fastener 230 with the support rod 220 also allows radial adjustment of the nozzle turrets 110, 112 to maintain proper nozzle angle through the range of adjustment of boom 108.

The spray assembly 102 may also include two identical pressure gauges 116, 118. The pressure gauges 116, 118 are fluidly connected between the hoses 120, 122 and the respective nozzle turrets 110, 112. The pressure gauges 116, 118 provide a visual output regarding the fluid pressure being provided to the nozzle turret 110, 112 by the hoses 120, 122. The pressure gauges 116, 118 allow a user to better compare the spray characteristics of the nozzles 114 by understanding the fluid pressure provided thereto. The pressure gauges 116, 118 are generally located on the boom so as to be easily viewable by both an operator and audience.

In one embodiment, the pressure gauges 116, 118, nozzle turrets 110, 112, one or more valves, and a hose fitting may be connected to form a substantially unitary nozzle assembly structure. This nozzle structure allows for the nozzle turrets 116, 118 to be repositioned on the boom 108 without requiring the individual components (e.g., pressure gauges 116, 118) to be repositioned separately. This decreases the complexity involved in precisely moving each individual component of the nozzle assembly to a new location, increases the rigidity of the assembly, and increases the speed at which the nozzles can be relocated along the boom.

Figure 4:
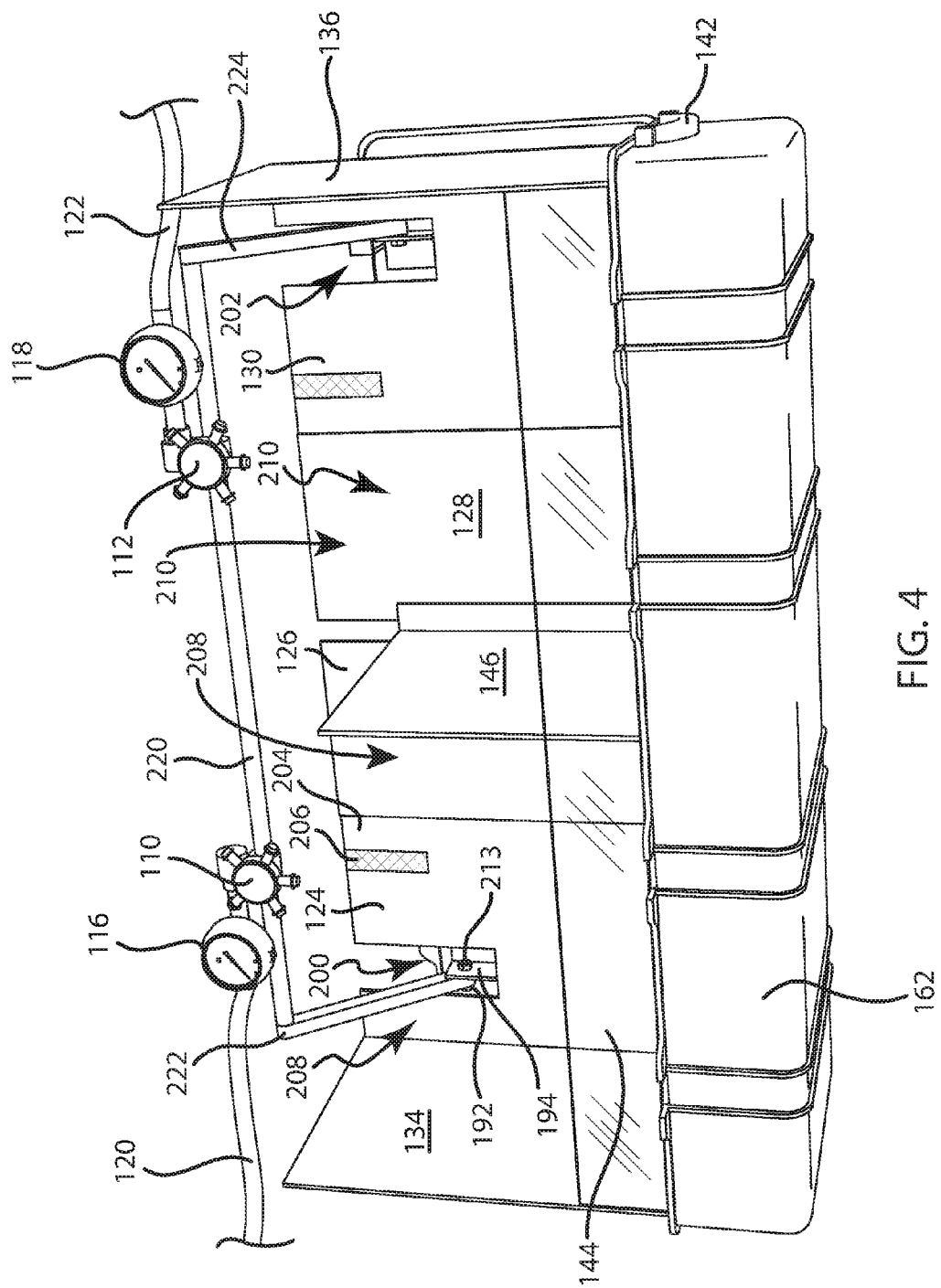
FIG. 4 is a bottom isometric view of the spray assembly of FIG. 2.

With reference to FIG. 4, the spray in assembly 102 may also include two or more hinge brackets 194. The hinge brackets 194 may be connected to the cover 160 and the boom 108. The hinge brackets 194 may be integrally formed with the cover 160 or may be a separate component connected thereto. A threaded axle 213 is used to connect the boom 108 to the hinge brackets 194. In one embodiment, the outer surface of the axel 213 may include knob ends of sufficient size and clamping surfaces such that when hand tightened, adequate friction is provided such that the boom 108 may be adjusted through a substantially infinite range of angles around the axle 213. Additionally, the axel 213 is configured so that the friction between the brackets 194 and the boom 108 will be sufficient to hold the position of boom 108 at various heights relative to the base 162.

Figure 2:
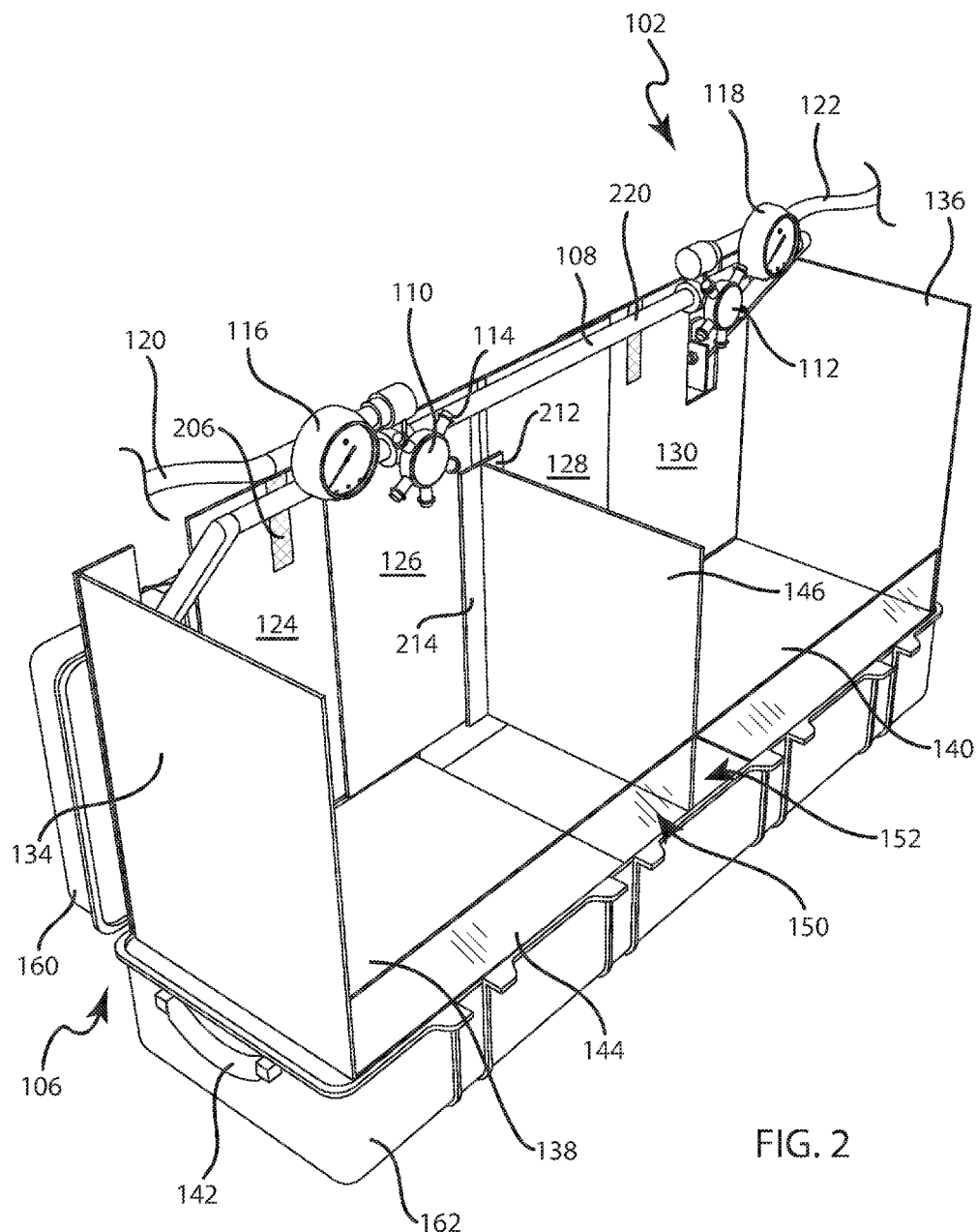
FIG. 2 is a top isometric view of a spray assembly of the demonstration kit of FIG. 1.

With reference to FIGS. 2 and 11, the spray assembly 102 may also include two or more floor panels or spray catch panels 138, 140. As will be discussed in more detail below, the spray catch panels 138, 140 in the operation orientation may be connected to side panels 134,136, respectively, by a watertight and flexible hinged connection such as waterproof adhesive. This ensures that fluid impacting the sidewalls 134, 136 will be directed back towards a center of the case and into the reservoirs.

The spray catch panels 138, 140 may be used in conjunction with the recirculation reservoirs 240, 242 and may be sized to fit inside reservoir trays 240,242, so as to slope from the hinge points on sidewalls 134, 136 towards a center of the base 162. The edges of the spray catch panels 138, 140 may be supported by the top surfaces of filters 244, 246. This allows the fluid to travel from the vertical surfaces of the sidewalls 134, 136 over the hinge and onto the spray catch panels 138,140 then be channeled into the recirculation reservoirs 240, 242 respectively towards a drain gap 150, as will be explained below. In instances where the recirculation reservoirs trays 240 and 242 are omitted the catch panels 138,140 can be folded vertically planar and affixed to the sidewalls 134, 136 so as to be stored out of the way or to be removed from the kit 100.

Figure 13:
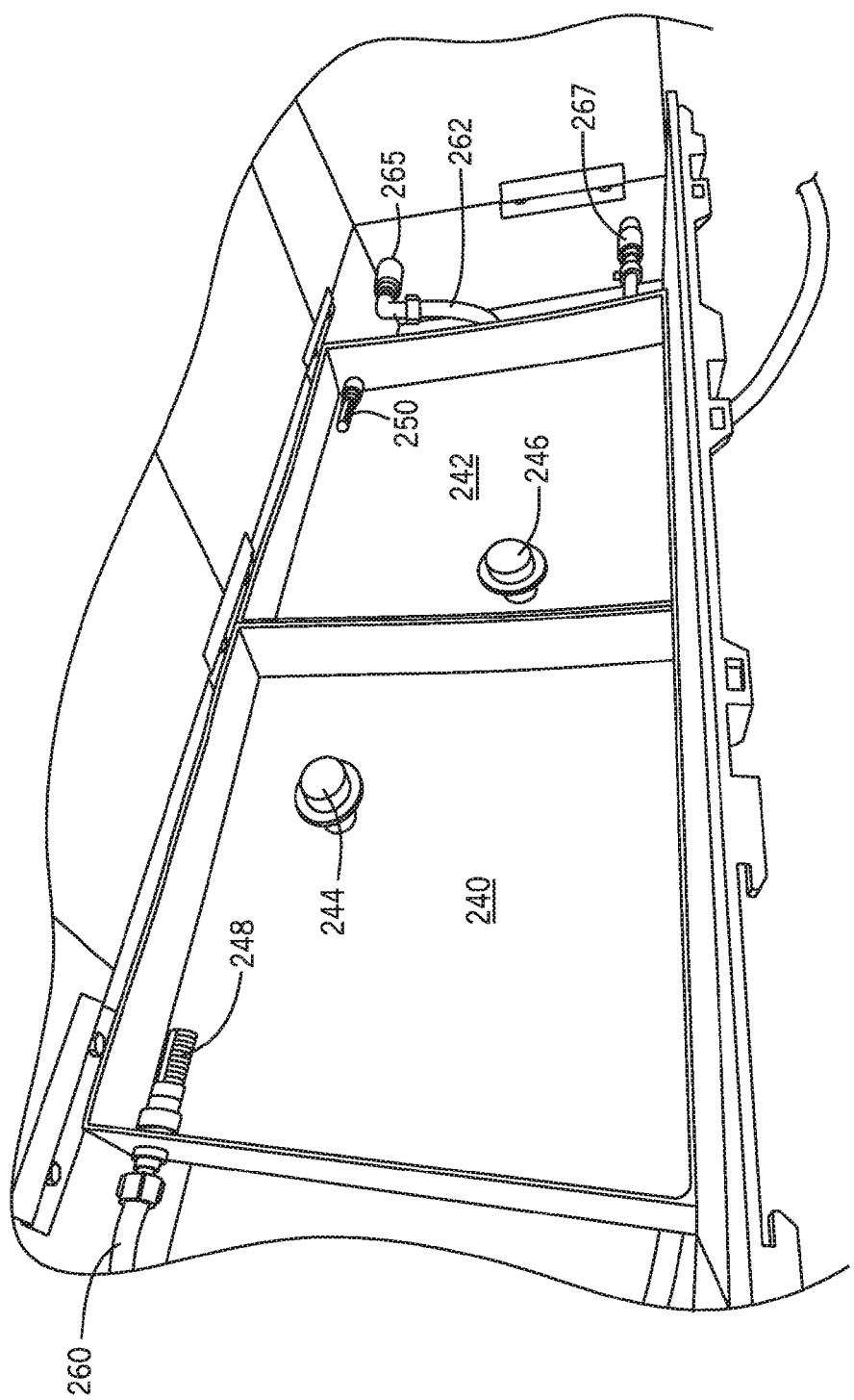
FIG. 13 is a top isometric view of the base of the spray assembly illustrating the reservoir tanks.

In some embodiments, the spray assembly 102 may include a reservoir tray or reservoir tank. FIG. 13 is a top perspective view of the spray assembly 102 with the spray catch panels 138, 140 in the vertical planar position so that they are hidden in this view for clarity. With reference to FIG. 13, the spray assembly 102 may include a first reservoir tray 240 and a second reservoir tray 242. Each of the trays may define a cavity that receives fluid from the nozzles 114 and is fluidly connected to the control assembly 104. For example, each of the reservoir trays 240, 242 may include a drain or reservoir outlet 248, 250 that is fluidly connected to connection hoses from the control assembly 104.

Each of the trays 244, 246 may also include filters 244, 246. The filters 244, 246 allow the demonstration kit 100 to be run in a non-circulation mode such as with an external reservoir or fluid source. The filters 244, 246 may be screwed into the end of a hose assembly to fluidly connect the reservoirs to a storage or drain container or area. In the recirculation mode, the top ends of the filters 244, 246 are used to support the catch panels 138, 140 to prevent the panels from becoming submerged within the reservoir.

In some embodiments, the spray assembly 102 may include a reservoir tray 240, 242 for each spray chamber 208, 210, where the reservoir trays 240, 242 are fluidly connected to the nozzle turrets 110, 112 of each respective spray chamber 208, 210 via the drain gaps 150, 152 (i.e., the space uncovered by the catch panels). By having two separate reservoir trays 240, 242 the demonstration kit 100 may be used simultaneously with two different fluids. However, in instances where one type of fluid may be used in both spray chambers 208, 210 of the spray assembly 102 may include a single reservoir, e.g., the base 162 itself may function as the reservoir. Similarly, in instances where more than two types of fluids may be used, the spray assembly may include more than two reservoirs.

Figure 14:
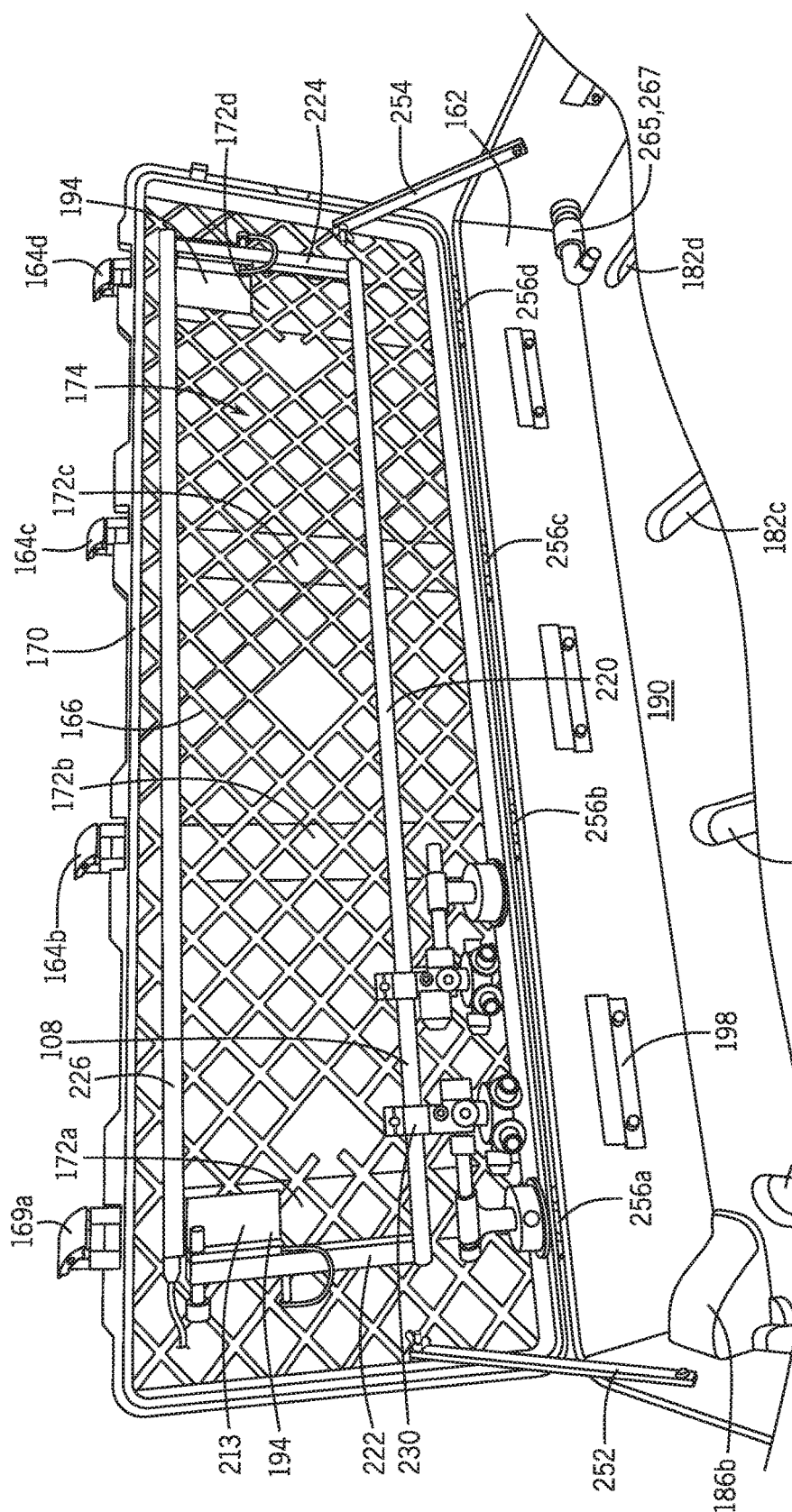
FIG. 14 is a top isometric view of the base of FIG. 13 with select elements hidden for clarity.

Assembly of the spray assembly 102 will now be discussed in more detail. FIG. 14 is a top perspective view of the case 106 of the spray assembly with select elements hidden for clarity. With reference to FIGS. 2, 7, 9A, 10A, and 14, the base 162 may be connected to the cover 160 through one or more hinges 256a, 256b, 256c, 256d that rotatably connect the cover 160 to the base 162. In addition to the hinges 256a, 256b, 256c, 256d, two support bars 252, 254 may be connected to the sidewalls 170, 184 of the cover 160 and base 162. Each of the support bars 252, 254 may be connected to a portion of the sidewall forming an end of the case 160 or base 162 and extend towards a corresponding end sidewall of the other of the case 160 or the base 162. In this manner, the support bars 252, 254 may extend at an angle between the cover 160 and the base 162 to provide additional strength and support for when the cover 160 is in the open position and substantially perpendicular to the base 162.

The support bars 252, 254 may be substantially rigid to help prevent the cover 160 from rotating forward towards the base 162 until a user desires to rotate the cover 160. Support bars 252, 254 lock the precise perpendicularity of the cover 160 in relation to the base 162, which assist in maintaining the balance of the spray assembly 102, especially during operation. In this particular embodiment, hinges 256a-d allow the cover 160 a rotative range of greater than 180 degrees in relation to the base 162 if the support bars 252, 254 are not installed. In other embodiments, this perpendicularity could be designed as a limiting characteristic of the hinges 256a-d, and another locking feature could be designed to prevent the cover 160 from unintentionally closing. In some embodiments, components for the spray assembly 102 may be anchored to the interior surface 168 of the cover 160 to increase the weight of the cover 160 while the support bars 252, 254 help to support this additional weight so that the cover 160 may remain substantially perpendicular to the base 162 when in the operating orientation.

Once the base 162 is connected to the cover 160, the boom 108 may be connected to the cover 160. In particular, the hinge brackets 194 may be fastened or otherwise secured to the interior surface 168 of the cover 160. The arms 222, 224 of the boom 108 may then be connected via the axel 213 or other fastener to the hinged bracket 194. The axel 213 may be selected so as to form a hinge 192 between the arms 222, 224 of the boom 108 so that in a first position the arms 222, 224 may extend upwards and outwards from the cover 160 and raise the boom support rod 220 above a top edge of the cover 160 in the open positioning and allow the boom 108 to rotate about the pivot at the hinge 192 to a collapsed position where the boom 108 is received within the cover cavity 174. In the collapsed position, the boom 108 may be parallel to the longitudinal portions of the sidewall 170, and the arms 222, 224 may be parallel to the end portions of the sidewall 170 of the cover 160.

The light element 226 may then be connected to the spray assembly 102. In one embodiment, the lighting element is affixed to the back wall panels 124, 134,136 by the attachment feature 208. As briefly explained above, the length of the attachment feature 208 may be selected so that the lighting element 226 may be positioned at varying vertical positions relative to the base 162.

As shown in FIG. 14, the lighting element 226 includes the light bulbs (LEDs in this case) adhered to a square aluminum tube. That backside of the tube includes an adhesive hook corresponding to the adjustment features 206 on the back wall panels 124, 134 and 136. A removable two-pole electrical connector may also be included on the lighting element 226.

In addition to affixing the light element 226 to the back panels 124, 134,136 by the hook and loop fasteners (or other type of fasteners) provides additional rigidity to the panel assembly. The connection of the lighting element 226 to the cover 160 may depend on the type of lighting element 226 used as well as the desired location of the light, as such many different connection mechanisms and locations are environed. In some embodiments, the lighting element 226 may be connected in a similar manner to the boom 108 and may be rotatable from an extended position to a collapsed position. For example, the lighting element 226 may include hinges that allow the lighting element 226 to be repositioned relative to the cover 160. Alternatively, the lighting element 226 may be fixed to the cover and the boom 108 may be moved into an operating orientation so as to provide a light path for the light emitted by the lighting element. However, in embodiments where the lighting element 226 is connected to the back panels it may be more easily focused on the spray patterns emitted from the nozzles 114 and less of the light may be blocked by other components.

With reference to FIG. 13, the reservoir trays 240, 242 may be at least partially received within the base cavity 190 and secured to the sidewall 184 of the base 162. For example, the reservoir trays 240, 242 may include brackets that attach the sidewall 184. In another example, as shown in FIG. 13, the reservoir trays 240, 242 may have a width that substantially matches a width of the base 162 and may be press-fit into the base 162. In this example, the reservoir trays 240, 242 may be oriented at a slight angle (such as by being propped against the drain hoses) so as to encourage thorough draining and reducing the amount of liquid needed to operate the spray assembly. In yet another example, the reservoir trays 240, 242 may be seated on shelves that extend from the sidewall and/or may be seated on the interior bottom surface 180 of the base 162.

The reservoir tanks 240, 242 may then be fluidly connected to the control assembly 104 via the outlets 248, 250. In particular, the outlets 248, 250 may be connected to the interior check valves 265, 267 via one or more tubes. With reference to FIG. 13A, the interior drain hoses may be fluidly connected to the reservoir trays 240, 242 and to check valves 265, 267 on the right end of the base 162. The check valves 265, 267 may be internally check valved ports so as to be substantially flush with the outer surface of the base 162, which helps to protect the valves during storage and transportation of the spray assembly 102. The check valves 265, 267 may then be connected to the control box 102 via additional hose connectors, hoses, and the like. The check valves 265, 267 when detached from external hoses may automatically seal to prevent fluid from leaking from the base 162. This allows the fluid to be contained in the base 162 and allows the base cavity to be used as a reservoir if desired.

With reference to FIGS. 11 and 12, once the boom 108 is connected to the cover 160, the nozzle turrets 110, 112 may be connected to the boom 108. In particular, the connection fastener 230 may be secured to the support rod 220 via the wing nut 232. For example, the two clamps may be positioned around the support rod 220 and the wing nut 232 is connected to the ends of the two clamps and secured to clamp the connection fastener 230 to the support rod 220. The nozzle turrets 110, 112 may be located at a desired position along the length of the support rod 220. As discussed above, the pressure gauges 116, 118 may be permanently secured to the nozzle turrets 110, 112 via the nozzle assembly and the nozzle assembly may include a quick-disconnect fitting that attaches to a corresponding quick disconnect fitting on the inlet hoses 120, 122.

The catch panels 138, 140 may then be connected to the sidewalls 134, 136 and extend over the opening in the base 162. The edges of the catch panels 138, 140 rest against the top ends of the filters 244, 246 so that they are angled so as to define a sloped floor that encourages fluid to flow towards the drain gaps 150, 152. Fluid traveling on the top surface of the floor panels 138, 140 may be drained into the reservoir tanks 240, 242 through the drain gaps 150, 152.

In one embodiment the floor or catch panels 138, 140 may be connected to a point on the sidewalls such as through adhesive, tape or may be formed integrally therewith and a crease or fold line may be used to separate the panels from one another. The sidewall panels 134, 136 extending upwards from the base 162 and are orientated substantially parallel to the end sidewalls of the base 162.

The back wall panels 124, 126, 128, 130 can be connected along a back longitudinal sidewall of the base 162. The back wall panels may be connected by a plurality of brackets 196, 198 and may be configured so that the panels are mounted below the top edge of the base 162. In this configuration, the panels are better able to prevent wicking and loss of the overspray that could happen if the panels were mounted on top of the edge or behind the edge of the base.

The first sidewall 124 may be oriented such that the cutout 200 may be aligned with the hinge bracket 194 and the boom arm 222 so that the boom 108 can extend from the cover 160 outward through the cutout 200. Similarly, the back wall 130 cutout 202 may be aligned with the boom arm 224 and the corresponding hinge bracket 194 to allow the boom 108 to extend outwards through the cutout 204. The two panels 124, 130 may be connected to the base 162 via wall brackets 196, 198 connected to the sidewall 184 of the base 162. The brackets 196, 198 help to secure the panels in position on the base. The middle panels 126, 130 may be connected to the brackets 196, 198 as well in a similar manner as the other panels.

In the current embodiment, the end back wall panels 124, 130 may be formed integrally with the sidewall panels 134, 136. The perpendicular angle of the side panels and the back panels, along with the attachment of the center panel to the cover (e.g., through hook and loop), the lighting element 226, and the attachment of the panels to each other provides additional rigidity for the panels. In these embodiments, the rigidity of the panel material and the back wall panels 124, 140 connection to the brackets 196, 198 helps to secure the sidewall panels 134, 136 to the base 162. It should be noted that the spray assembly may include more brackets, in one example, there may be five brackets, that connect to the panels.

The dividing wall 146 may then be connected to its corresponding fastener points on the back wall panels 126, 128 based on a desired location of the dividing wall 146. In one embodiment, the tabs 214, 216 may extend parallel to the back wall panels 126, 128 when the dividing wall 146 is connected thereto whereas the dividing wall 146 may be perpendicularly oriented relative to the back wall panels 126, 128. In many instances the dividing wall 146 may be oriented so as to be placed at the junction between the two reservoir trays, which helps to ensure that fluid from the spray chambers remains in each chamber's respective reservoir.

The attachment feature 206 allows the dividing wall 146 to be located at substantially any location along a length of the base 162, which allows the length of the spray chambers 208, 210 to be varied by a user. For example, a user can place the dividing chamber 146 at multiple locations based on the desired spray characteristics to be demonstrated with the demonstration kit 100.

The splash guard 144 may then be connected to the spray assembly 102. The splash guard 144 may extend along the opposite base sidewall from the back wall panels 124, 126, 128, 130 and may be substantially perpendicular to the sidewalls 134, 136 and the dividing wall 146.

In the traveling orientation, the various panels 124, 126, 138, 130, 134, 136, floor panels 138, 140, and dividing wall 146 may be disconnected from the base 162 and each other and be received within the base cavity 190 for storage. Similarly, the splash guard 144 may be positioned within the base cavity 190 for storage.

With reference again to the operation orientation of the demonstration kit, the boom 108 may then be rotated so as to be adjacent the interior surface 168 of the cover 160. The lighting element 226 and the boom 108 may be configured such that they are received within the cover cavity 174 when it the collapsed or traveling orientation (see FIG. 14).

After the components of the spray assembly 102 are positioned within the cover 160 and/or base 162, the cover 160 may be rotated relative to the base 162 and the latches 164a, 164b, 164c, 164d may be closed to secure the cover 160 to the base 162. In this manner, substantially all, or all of the components, of the spray assembly 102 may then be transported by carrying or rolling the case 106. This allows the spray assembly 102 to be portable and easily moved.

The splash assembly 102 may further include one or more support legs. For example, the support legs may be connected to the bottom of the base 162 through one or more brackets. The legs may be slid through the brackets and extend past the front and back surfaces of the base 162. The legs may include skid pads to help reduce the base from sliding on the support surface (e.g., table, floor, etc.). The legs provide additional stability for the assembly, especially during operation.

Control Assembly

Figure 15:
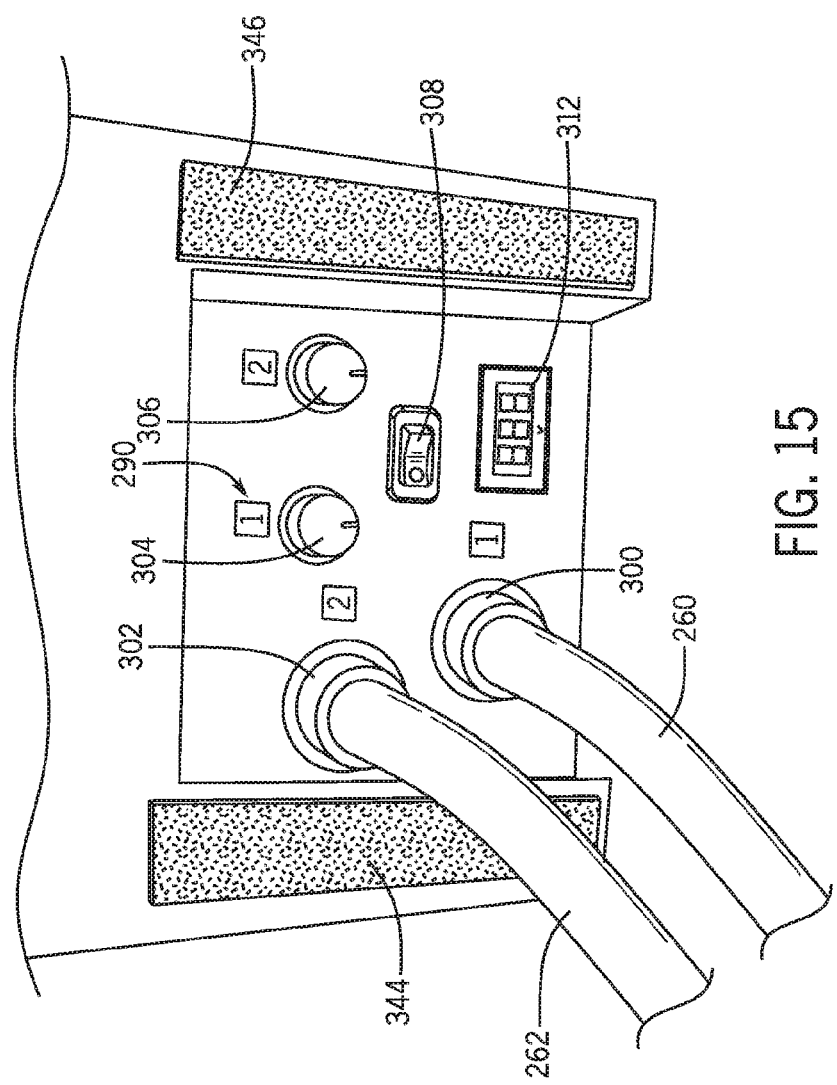
FIG. 15 is an enlarged view of a control assembly of the demonstration kit of FIG. 1.
Figure 16:
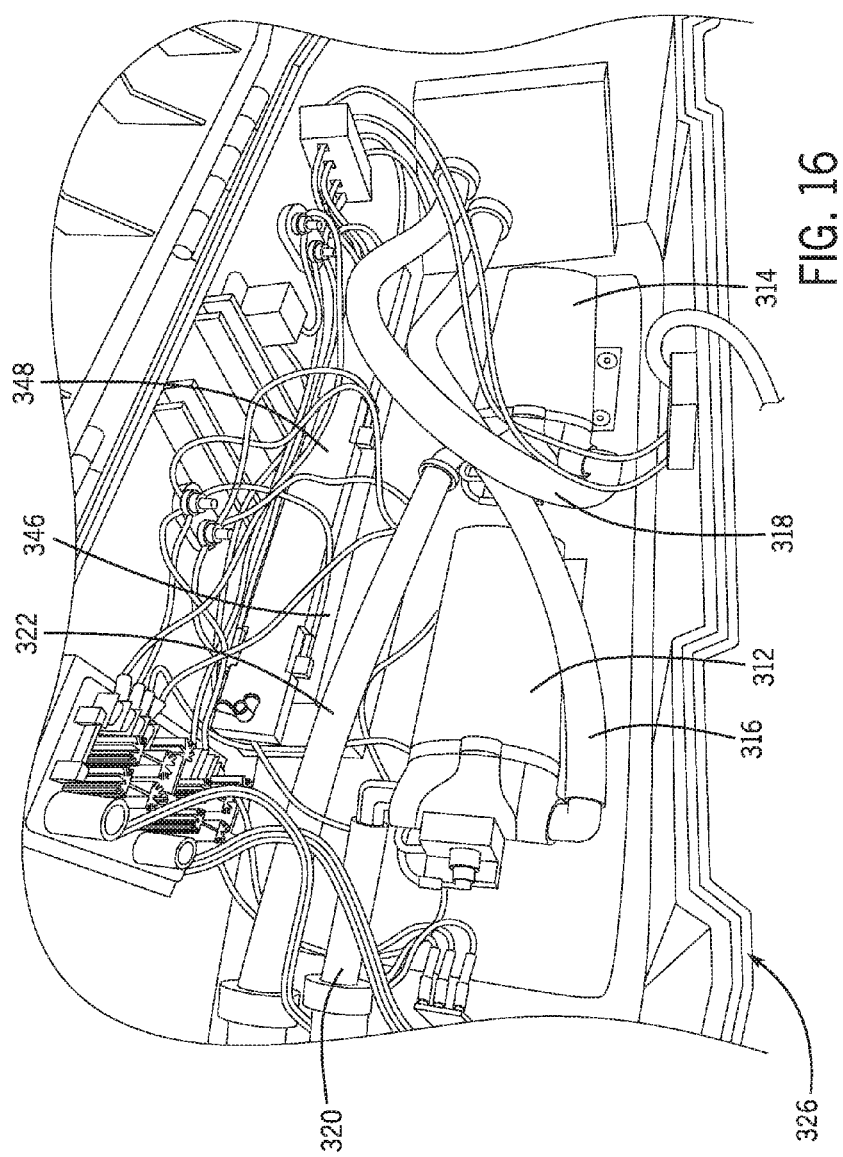
FIG. 16 is a top isometric view of the control assembly of FIG. 15.
Figure 17:
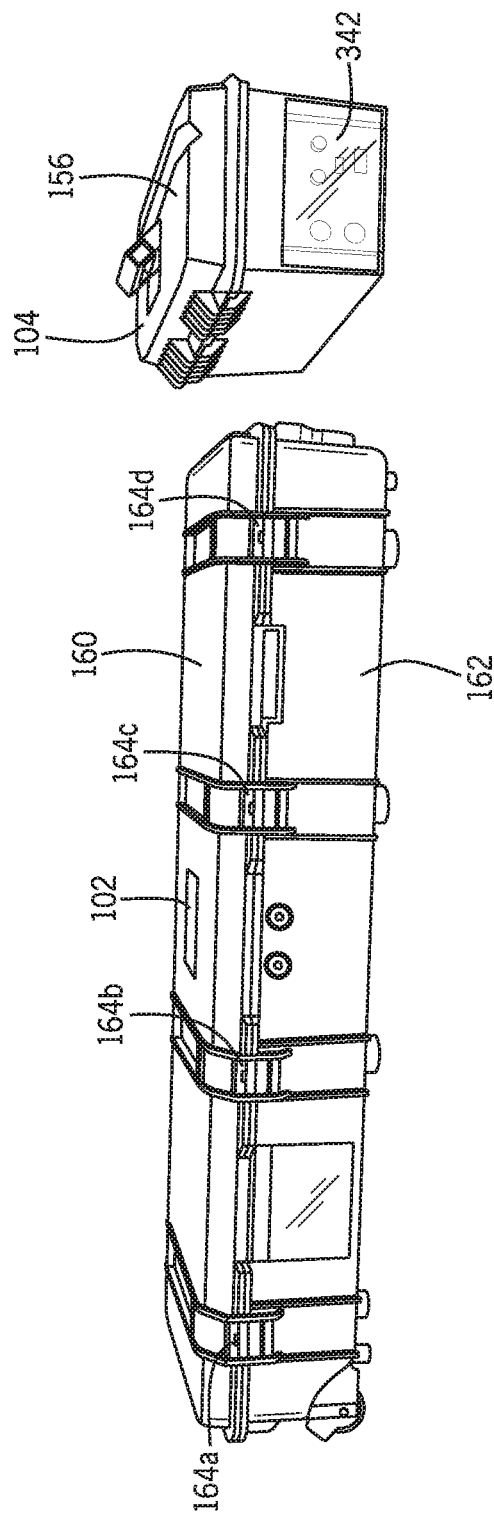
FIG. 17 is a front isometric view of the demonstration kit of FIG. 1 in a traveling or packed orientation.

The control assembly 104 will now be discussed in more detail. FIG. 15 is an enlarged front view of the control assembly illustrating a control panel. FIG. 16 is a top perspective view of the control assembly with the case in an open position. FIG. 17 is a perspective view of the demonstration kit in a traveling orientation. With reference initially to FIGS. 1, 15, and 16, the control assembly 104 may include a control case 156 or box. Similar to the case 106 of the spray assembly 102, the control case 156 may include a cover 388 and a base 340. The control case 156 may be substantially similar to the spray case 106, but may have a shorter length than the spray case 106. The control case 156 houses the control system for the demonstration kit 100 and is fluidly connected to the spray assembly 102 through plurality of hoses and valves 120, 122, 260, 262, 265, 267, as will be discussed in more detail below.

A control panel 290 may be connected to an outer surface on a first end of the base 340 of the control box 156. The control panel 290 includes two inlets 302, 300 that are fluidly connected to hoses from the spray assembly 102. Additionally, the control panel 290 may include a plurality of input buttons or dials 304, 306, 308 that may be used to operate the demonstration kit 100. For example, two of the input dials 304, 306 may be rheostats that are used to vary the speed of the corresponding pumps 312, 314 and thereby the outlet flow from the pumps. Varying the pump speed results in varying pressure differences depending on the nozzle 114 chosen at turret 110,112. The electronic control of the pumps via the input dials 304, 306 allows for easy adjustment of the pump characteristics without having to manually adjust any features (e.g., manually vary the flow path, siphon fluid off the flow, etc.) within the control assembly and/or spray assembly. The third button 308 may be used to turn the control assembly 104 on or off. Finally, the control panel 290 may also include a display 312. In the example shown in FIG. 15, the display 312 is used to provide a visual output of the currently available voltage. However, in other embodiments, the display 312 may be used to display other characteristics of the control assembly 104, e.g., flow rate, fluid pressure, etc.

In some embodiments the control panel 290 may also include a remote switch. The remote switch may be used to selectively activate remote operation of the control panel 290 and/or control assembly 104. For example, the remote switch may be used to activate a remote sensor (e.g., infrared sensor) that detects signal from a remote controller. See, e.g., FIG. 22.

With reference to FIG. 16, the control assembly 104 may include one or more pumps 312, 314. In one example, the control assembly 104 may include one pump 312, 314 for each nozzle turret 110, 112. However, in some instances the spray assembly 102 may include multiple turrets 110, 112 that can be selectively connected to a pump and therefore may include more turrets 110, 112 than pumps. In the example shown in FIG. 16, each of the pumps 312, 314 may be substantially similar to each other.

The pumps 312, 314 may be self-priming diaphragm pumps and generally chemical resistant. In some embodiments the pumps may pump around 100 psi with a low amp draw from the power supply. For example, the pumps 312, 314 may be 12 volt pumps and pump at least 1.4 gallons per minute under full pressure at full speed.

The pumps 312, 314 may be controlled by a pulse width modulation (PWM) signal from the control circuit. The PWM signal selectively provides a constant voltage to the pumps 312, 314 in order to vary the speed of the pumps. This means that the pumps 312, 314 are selectively turned on/off in short bursts in order to create the desired output flow. Because the pumps 312, 314 are driven by the PWM signal they do not run at full power, which reduces the power consumed by the pumps 312, 314, prolonging the battery life for the control assembly 104. Additionally, because the characteristics of the pump can be changed electronically, the system does not need to include a pump bypass to vary the output pressure. By not having a bypass, the demonstration kit may be easier to clean and decontaminate as the fluid path from the reservoir to the nozzles may be unsophisticated, i.e., not a lot of turns, bends, or corners.

As one example, by running the pumps 312, 314 at 0.75 amps, the pumps 321, 314 may consume only a third of the power as typically required and may operate on the battery power alone for over 1 hour. Conventional demonstration devices typically varied the flow speed and characteristics by manually changing the flow path, e.g., through exhausting fluid, bypassing, or diverting fluid, so that the pumps were typically run at their constant full power, which increased the power consumed.

As will be discussed in more detail below, the diaphragm configuration of the pumps 312, 314 creates a pulsing fluid flow, which depending on the operating speed, may create visible pulses in the fluid that may not be desirable for certain nozzle demonstrations. Accordingly, in some embodiments the control assembly 104 includes a dampening assembly. With reference to FIG. 16, the control assembly 104 may include two dampening tubes 316, 318 that form the dampening assembly. In other embodiments, the dampening assembly may include one or more pulsation dampeners.

The dampening tubes 316, 318 may be formed of a flexible material that can expand and contract with the fluid flow, such as an elastomeric material. For example, in one embodiment the dampening tubes 316, 318 may be a ½' NORPRENE tubing having a durometer hardness shore A and a value or rating of 61. In operation, the dampening tubes 316, 318 absorb the fluctuations in the fluid by expanding and contracting. The tubes 316, 318 thus act to dampen the pulses and flatten out the fluid flow to remove the sinusoidal (or other wave shape) introduced into the flow due to the PWM signal driving the pumps.

The damping tubes 316, 318 may also include a more rigid material, such as a poly-braided material, on an interior surface. The rigidity provided by the additional structural material helps to retain the shape of the tubes 316, 318 and allows the tubes to handle higher pressures, such as pressures around 100 psi.

As briefly mentioned above, in some embodiments, the pumps 312, 314 and/or other components of the control assembly 104 may be incorporated into the spray assembly 102. However, in embodiments where the pumps 312, 314 are incorporated into the separate control assembly 104, the demonstration kit 100 may be easier to transport as the pumps 312, 314 may add additional weight to the spray assembly 102 and may be easier to transport separately. Additionally, the control box 104 may be smaller than the spray assembly 102 and may be stored in a separate location from the spray assembly 102. For example, it may be desirable to store the spray assembly 102 outdoors, in a warehouse, or other non-climate controlled environment based on available space and other factors. In this example, the control assembly 104 which includes the pumps 312, 314, may be stored separately from the spray assembly 102 so that the pumps 312, 314 can be stored in a climate controlled environment which may prevent damage to the pumps. As one particular example, during winter the pumps 312, 314 may be stored in a warm environment so that they are not damaged while the larger spray assembly 102 may be stored in a non-climate controlled area where space may not be as restricted.

The control assembly 104 may include an inlet hose 320, 322 and an outlet hose 316, 318 for each of the pumps 312, 314. The inlet hoses 320, 322 may be fluidly connected to quick-disconnects 300, 302, and their corresponding output quick-disconnects. These quick disconnects incorporate check valves to prevent escape of fluids when the hoses are disconnected. Suction hoses 260, 262 may be connected of the spray assembly 104, which fluidly connects the pumps 312, 314 to the reservoir trays in the spray assembly 102 via the check valves 265, 267. The dampening hoses 316, 318 of the control assembly 104 may be fluidly connected to the hoses 120, 122 of the spray assembly 102 via one or more quick disconnects.

The control assembly 104 may also include one or more power supplies or power assemblies. In one embodiment, the control assembly 104 may include a portable power supply and a fixed power supply. For example, as shown in FIG. 16, the control assembly 104 may include one or more batteries 346, 348 and may include a power cord in electrical communication with each of the batteries 346, 348. The power cord may be used to charge the batteries 346, 348 and may provide power to the control assembly 104 while in use. In this manner, the control assembly 104 may be used in locations without an alternating current power connection (e.g., wall outlet), but may also be used while the batteries 346, 348 are charging in locations that include a fixed voltage power supply. The batteries 346, 348 may include an adapter that connects to the fixed power supply, in some instances the adapter may be able to charge the batteries via an automobile charger (e.g., cigarette lighter outlet).

In one embodiment, the control assembly 104 may be configured to run on a 12 Volt direct current (VDC) power supply. In this embodiment, the batteries 346, 348 and the power cord may be configured to supply about 12 VDC to the control circuit 324 and control panel 290. In conventional spray demonstration tables, the power supply required to drive the pumps was around 110 or 220 volt AC supply depending on location. By using only 12 volts, the control assembly 104 of the present disclosure may be safer to use and may be used in more locations. In particular, because the control assembly 104 is fluidly connected to the reservoirs and fluids such as water are being pumped by the control assembly 104, the lower voltage used reduces the risk of injury to a user in the event that one of the pumps may leak or fluid may otherwise enter into the control assembly 104. Additionally, more locations may be able to supply the 12 VDC power supply as opposed to the higher 110 volt supply.

The control assembly 104 may also include the control circuit 324. The control circuit 324 may include a pulse-width modulated motor speed controller (PWM) for each pump, the controller varies the speed of its pump as a result of input from the rheostats incorporated in dials 304, 306. The control circuit 324 may be in electrical communication with the control panel 290 and the input buttons 304, 306, 308, the pumps 312, 314, and the batteries 346, 348. In this manner the control circuit 324 may operate one or more components of the control assembly 104 based on user input via the control panel 290. The control circuit may be modified as desired and may include a processor or another component that executes and receives instructions. In these examples the control circuit 324 may be able to receive user inputs such as a preprogrammed variations in fluid pressure, flow rate, or the like and execute those variations in a predetermined sequence. However, in other embodiments, the control circuit 324 may be less expensive and may not include a processor and may rely on user input to selectively vary the pumps.

With reference to FIG. 1, in an operating orientation the control assembly 104 may be powered on via the power switch 308 on the control panel 290 or one or more power switches 350, 352 on the spray assembly 102. Additionally, the reservoir hoses 260, 262 may be connected to the inlets 300, 302 in the control panel 290 through the check valves 265, 267 and the outlet hoses 120, 122 may be fluidly connected to the pump outlet hoses 316, 318 via a back side of the control case 156. In some embodiments, the reservoir hoses 260, 262 may be connected to a rear or another location on the control panel 290 (i.e., on another surface other than the surface including the various control buttons).

In this configuration, the control assembly 104 is configured to pull fluid from the reservoir trays 240, 242 of the spray assembly 102 and provide fluid to the nozzle turrets 110, 112 as discussed below. It should be noted that in the operating orientation, the cover 388 of the control case 156 may be opened or closed and the orientation of the cover 388 does not affect the operation of the components of the control assembly 104. However, in many instances it may be desirable to close the cover 388 when in the operation orientation so as to protect the internal components of the control assembly 104 from fluid splashing from the spray assembly 102 or other debris that may damage components of the control assembly 104.

With reference to FIG. 17, in the traveling or compact orientation, the cover 388 of the control box 156 may be closed over the base 340 and latched thereto. Additionally, the hoses 120, 122, 260, 262 may be disconnected from the control box 156. A protective cover 342 may be slid over the control panel 290 and attached via attachment features 344, 346 (see FIG. 15) on the outer surface of the control box 156. The protective cover 342 helps to prevent debris from entering into the control assembly 104 components via the inlets 300, 302 (that may be exposed to the elements when the hoses 260, 262 are disconnected). The protective cover 342 may also help to prevent the pumps 312, 314 from being inadvertently activated as the cover 342 may prevent the input buttons 304, 306, 308 from being switched on or off.

Operation of the Demonstration Kit

With reference to FIG. 1, operation of the demonstration kit 100 will now be discussed. Initially, both the spray assembly 102 and the control assembly 104 are arranged to be in the operation orientation. The reservoir trays 240, 242 may then be filled with a fluid (e.g., water, chemicals, or the like), or the base cavity 190 may be filled with a fluid, and/or the spray assembly 102 may be fluidly connected to a fluid source (e.g., external reservoir). Once the reservoir trays 240, 242 or another reservoir has been filed, a user may then activate the control assembly 104 by selecting the power switch 308. In some embodiments, the spray assembly 102 may include indicator lights 350, 352 that illuminate when the control assembly 102 is activated or alternatively the buttons 350, 352 may be used to selectively activate the control assembly 104 or select components thereof.

Once the control assembly 104 is activated, the control circuit 324 provides power from the batteries 346, 348 (or fixed power source) and provides a signal to the pumps 312, 314. The pumps 312, 314 then pull fluid from the reservoir trays 240, 242 through the hoses 360, 362 through the reservoir tank outlets 248, 250. The fluid then flows into the pumps 312, 314 through the inlets 300, 302 in the control panel 290. The fluid is then forced through to the pump outlet and into the respective dampening tubes 316, 318.

From the dampening tubes 316, 318, the fluid is provided to the hoses 120, 122. The fluid then travels through each pressure gauge 116, 118 into a respective nozzle turret 110, 112 and out the activated nozzle 114. The pressure gauge 116, 118 provides a visual output regarding the fluid pressure of the fluid within the hose 120, 122 as it is delivered to the nozzle turret 110, 112.

To change the fluid pressure or other characteristics, the user can rotate or otherwise modify the control knobs 304, 306 on the control panels 290. For example, by rotating the first control button 304, the user may increase or decrease the speed of the first pump 312, which may vary the output characteristics of the fluid exiting the nozzle 114 of the first turret 110. It should be understood that both pumps 312, 314 may operate at different speeds to produce varying output characteristics. For example, a user may wish to compare the same nozzle 114 at two different pump speeds to determine which outlet pressure may operate best with the nozzle. Alternatively, the pumps 312, 314 may be configured to operate at the same speed or otherwise varied so that nozzles having different geometries, shapes, materials, and/or different fluids can be more easily compared.

After the fluid exits the nozzle 114, the fluid hits the sloped floor panels 138, 140 and through gravity, is encouraged to head towards the drain gaps 150, 152. From the drain gaps 150, 152 the fluid is deposited into the reservoir trays 240, 242 allowing the fluid to be recirculated. This allows the demonstration kit 100 to reuse fluid such that fluid may not be wasted. Additionally, the recirculation of the fluids allows the spray assembly 102 to operate continuously for extended periods. It should be noted that the division between the reservoir trays 240, 242 and dividing wall 146 help to separate the fluid from the first spray chamber 208 from entering into the reservoir tank of the second spray chamber 210. This allows two separate fluids to be used at the same time.

Integrated Reservoir

Figure 18B:
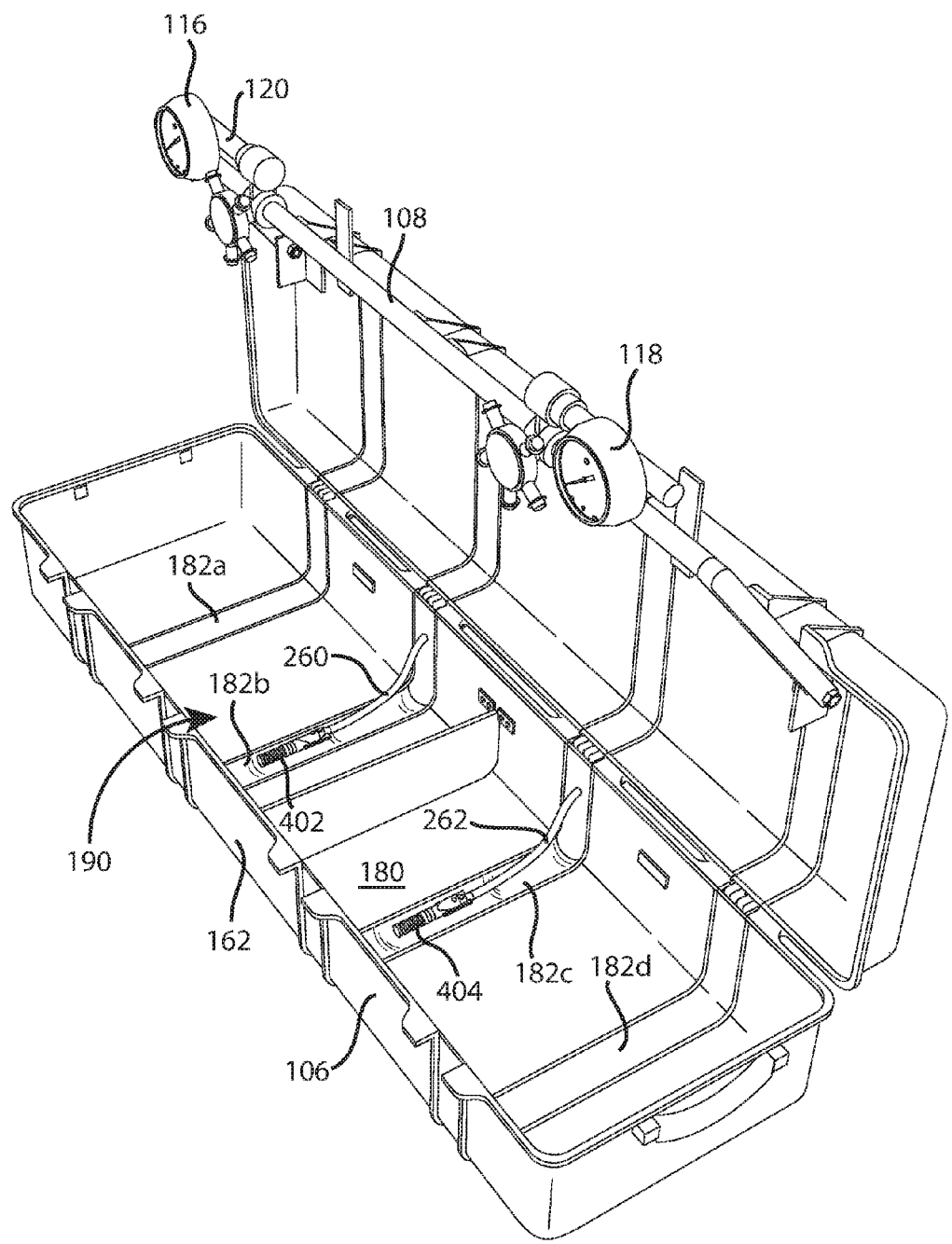
FIG. 18B is a right top isometric view of the demonstration kit of FIG. 18A.
Figure 18C:
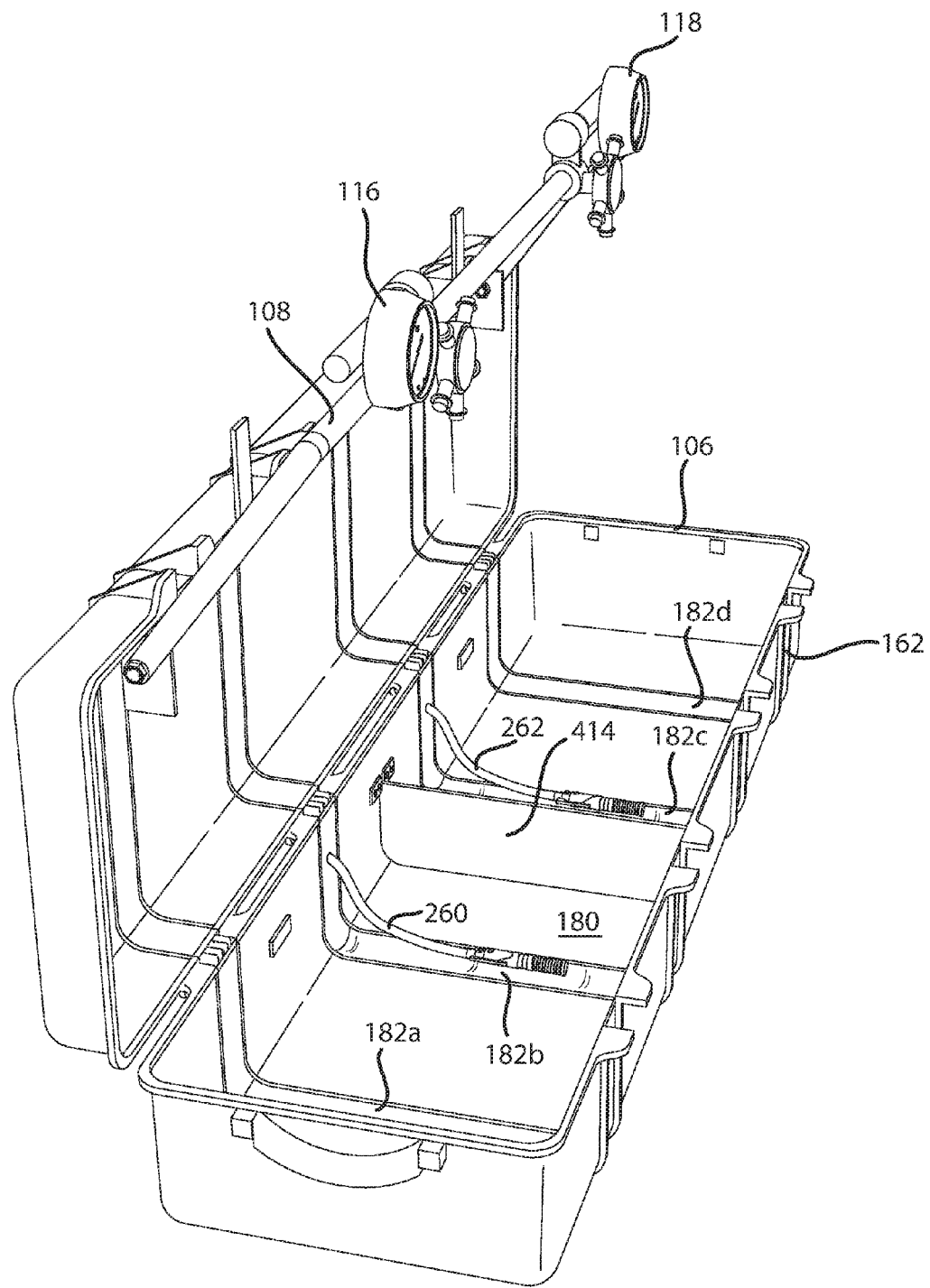
FIG. 18C is a left isometric view of the demonstration kit of FIG. 18A.
Figure 18D:
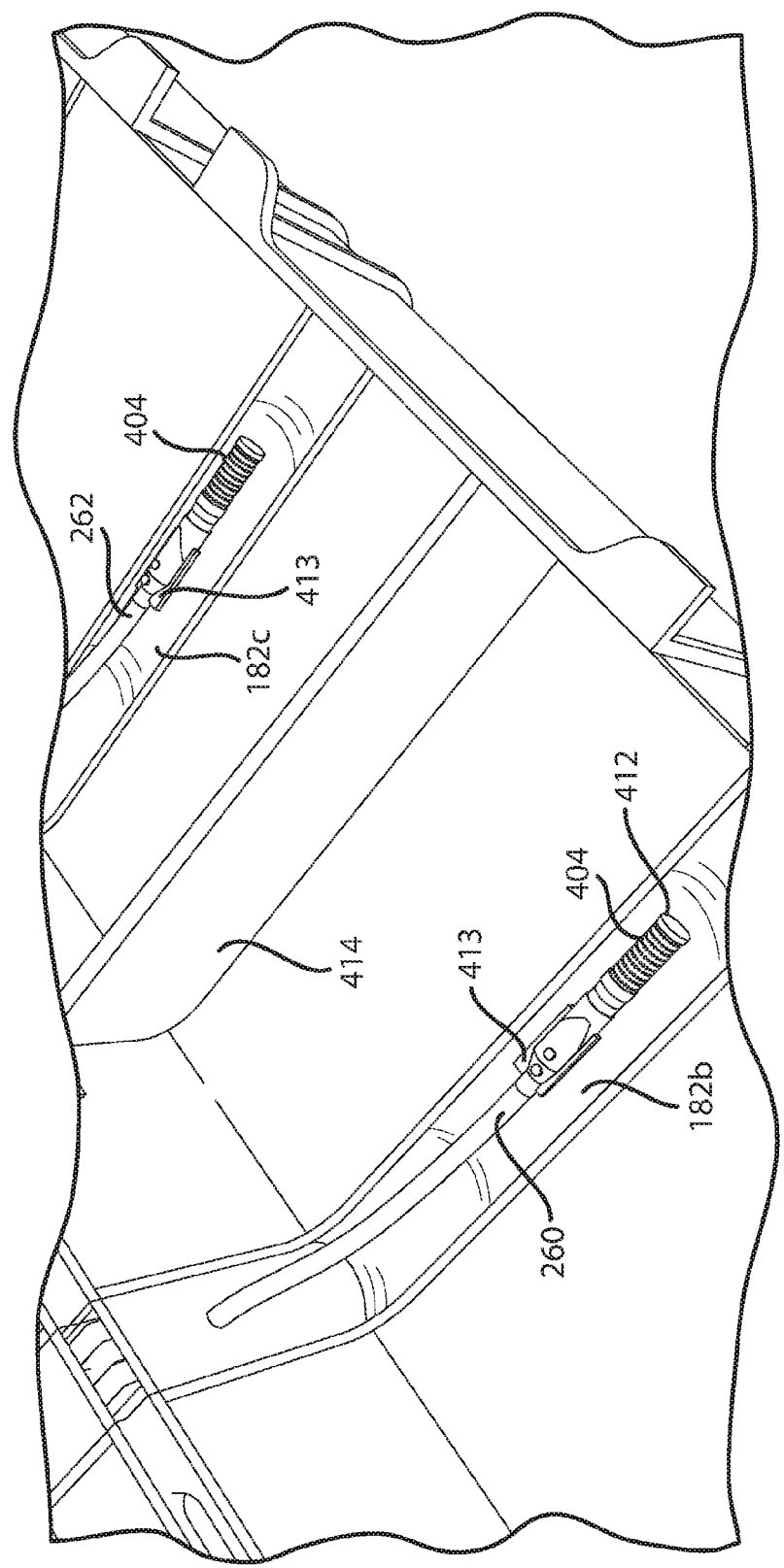
FIG. 18D is an enlarged view of FIG. 18C.
Figure 19:
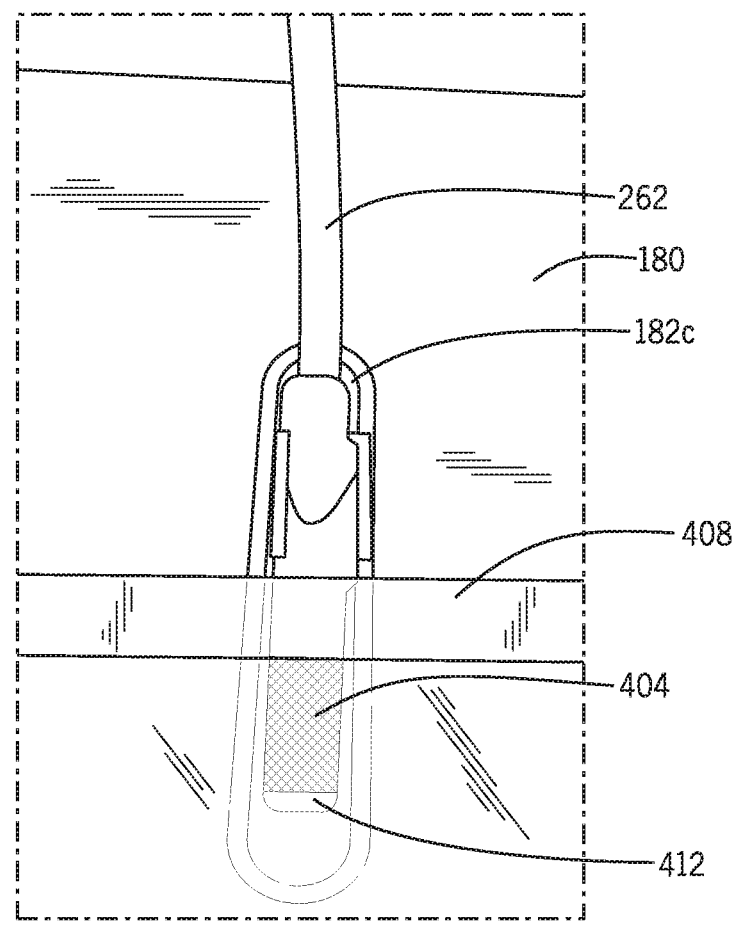
FIG. 19 is an enlarged top plan view of the demonstration kit of FIG. 18A including a fastener for securing the intake to the drainage area of the demonstration kit.

In some embodiments, the case 106 may define an integrated reservoir for the spray demonstration kit 100. FIGS. 18A-19 illustrate various views of an example of the demonstration kit with an integrated reservoir. With reference to FIGS. 18A-18D, in one embodiment, the base 162 of the case 106 may function as a reservoir with one or more of the recesses 182*a*, 182*b*, 182*c*, 182*d* of the floor 180 acting as drainage areas. For example, the recesses 182*a*, 182*b*, 182*c*, 182*d* may be sloped downward from other areas of the floor 180 so as to encourage fluid to flow from the floor 180 into one or more of the recesses 182*a*, 182*b*, 182*c*, 182*d*. In some embodiments, the base 162 may include a single drainage area or may include multiple drains as shown in FIGS. 18A-18D.

In embodiments including an integrated reservoir, the spray catch panels 138, 140 may be inserted into the base 162 in a similar manner as shown in FIGS. 2 and 3, but with the bottom end of the spray catch panels 138, 140 positioned against the floor 180 and/or edge of the desired recess 182*b*, 182*c*. For example, the first spray catch panel 138 may be arranged to direct fluid from the first nozzle turret 116 towards the second recess 182*b*, with the first recess 182*a* being substantially covered by the spray catch panel 138. Similarly, the second spray catch panel 140 may be positioned so as to direct fluid from the second nozzle turret 118 to the third recess 182*c*.

Alternatively, the spray catch panels may be omitted and the fluid emitted from the nozzle turrets 116, 118 may be drained directly to the floor 180 and the recessed configuration of the drainage areas or recesses 182*b*, 182*c* encourages the fluid to flow towards the respective recesses. In these embodiments, the base 162 may include recesses corresponding to the number of hoses 260, 262 so that fluid does not flow into recesses not including a drain. That is, in an embodiment including two pump hoses 260, 262, where the catch panels are omitted the demonstration kit 100 may include two drainage or recessed areas, rather than the four shown in FIG. 18A.

With reference to FIG. 18C, the case 106 may also include a divider 414 to define two fluid compartments or fluid reservoirs within the case 106. In embodiments where different fluids may be emitted from the nozzle turrets 116, 118, the divider 414 may be used to ensure separation of the fluids during the recycling process. For example, the divider 414 may extend between the two sidewalls and be sealed or extend from the floor 180 to prevent fluid from a first fluid compartment from entering into a second fluid compartment. In some embodiments, the divider 410 may be a separate component inserted into the case 106. For example, the divider 410 may be inserted into and fastened against the outer walls of the case, but may be removable to allow disassembly and use without the divider (e.g., for use with a single fluid).

The number and locations of the divider 414 may be varied based on the position of the nozzle turrets 116, 118, as well as the number of fluids used with the spray demonstration table. For example, in instances where three or more fluids may be used, three or more dividers 414 may be used. Additionally, the dividers 414 may be integrated with the case, permanently attached, or removable therefrom. As shown in FIG. 18B, two fasteners are used to secure the divider 414 to the rear sidewall of the case 106, but in other embodiments, other types of fastening mechanisms, such as, but not limited to, adhesive, bonding processes, or the like may be used.

With continued reference to FIGS. 18A-19, in embodiments including an integrated reservoir, the pump intake hoses 260, 262 may be positioned in one or more of the respective recesses 182*a*, 182*b*, 182*c*, 182*d*. For example, as shown in FIGS. 18A and 18B, the first pump intake hose 260 is positioned within the second recess 182*b* and the second pump intake hose 262 is positioned in the third recess 182*c*. The number of intake hoses and drainage locations may vary as desired. Locating the pump intake hoses 260, 262 and inlets in the drainage areas allows substantially all of the fluid to drain from the reservoir or base of the floor 180 into the inlets.

In some embodiments, the pump intake hoses 260, 262 may be configured to restrain an inlet 402, 404 within the recess 182*b*, 182*c*. For example, the hoses 260, 262 may be bent, clamped, or otherwise arranged so that the inlet 402, 404 remains within the lowest region of the recess 182*b*, 182*c*. Additionally or alternatively, with reference to FIGS. 18A and 19, in some embodiments, a fastener 408 or other securing member may be used to secure the inlet 402, 404 into the lowest area of the recess 182*b*, 182*c*. For example, adhesive, wires, or the like may be used to secure the inlet 402, 404 and/or portions of the hoses 260, 262 in a desired location within the recess 182*b*, 182*c*. The fastener 408 (see FIG. 19) assists in ensuring that the inlet 402, 404 is located in the drain and that fluid will flow from the bottom or floor 180 of the base towards the inlet 402, 404 so that the fluid can travel back to the pump assembly via the hoses 260, 262. The fastener may be adhesive or another component configured to secure the inlet in the drain area. In one embodiment the fastener 408 may include an attraction plate 415. The attraction plate 415 may be positioned in the drain and may be a metal or other magnetic material, such as stainless steel, that is affixed to the drain. The attraction plate 415 is configured to exert a force, in one example, a magnetic force, against the inlet 402, 404 to help ensure that the inlet 402, 404 remains in the desired location in the drain. In these embodiments, the inlets 402, 404 may include a magnetic element or other corresponding attraction element that interacts with the attraction screen.

In some embodiments, the inlets 402, 404 may also include a filter 412. The filter 412 may be located on a terminal end of the inlets 402, 404 and acts to substantially prevent particles and debris from entering into the hoses 260, 262. For example, the filter 412 may be a mesh or screen with openings of a predetermined size that allow water and other fluids to pass therethrough, but block the passage of particulates and the like. The size and configuration of the filter 412 may be selected based on the fluids used and the like. By preventing debris from flowing in to the hoses 260, 262 the filter 412 helps to ensure that the pumps and other components of the demonstration kit 100 are not damaged. In embodiments including the attraction plate 415, the attraction element for the inlets 402, 404 may be included within, incorporated into, or connected to the filter 412. In other embodiments, the attraction element may be connected in other areas as well.

With reference to FIGS. 18A-19, the demonstration kit 100 of FIGS. 18A-19 operates in substantially the same manner as the demonstration kit 100 of FIG. 1. However, rather than the fluid from the spray assembly 104 draining from the spray catch panels 138, 140 into the reservoirs 240, 242, the fluid may drain from the spray catch panels 138, 140 into the recesses 182*b*, 182*c*. Alternatively, the spray catch panels 138, 140 may be omitted and the fluid may drain directly into the recesses 182b, 182b.

Additional Embodiments

Figure 20:
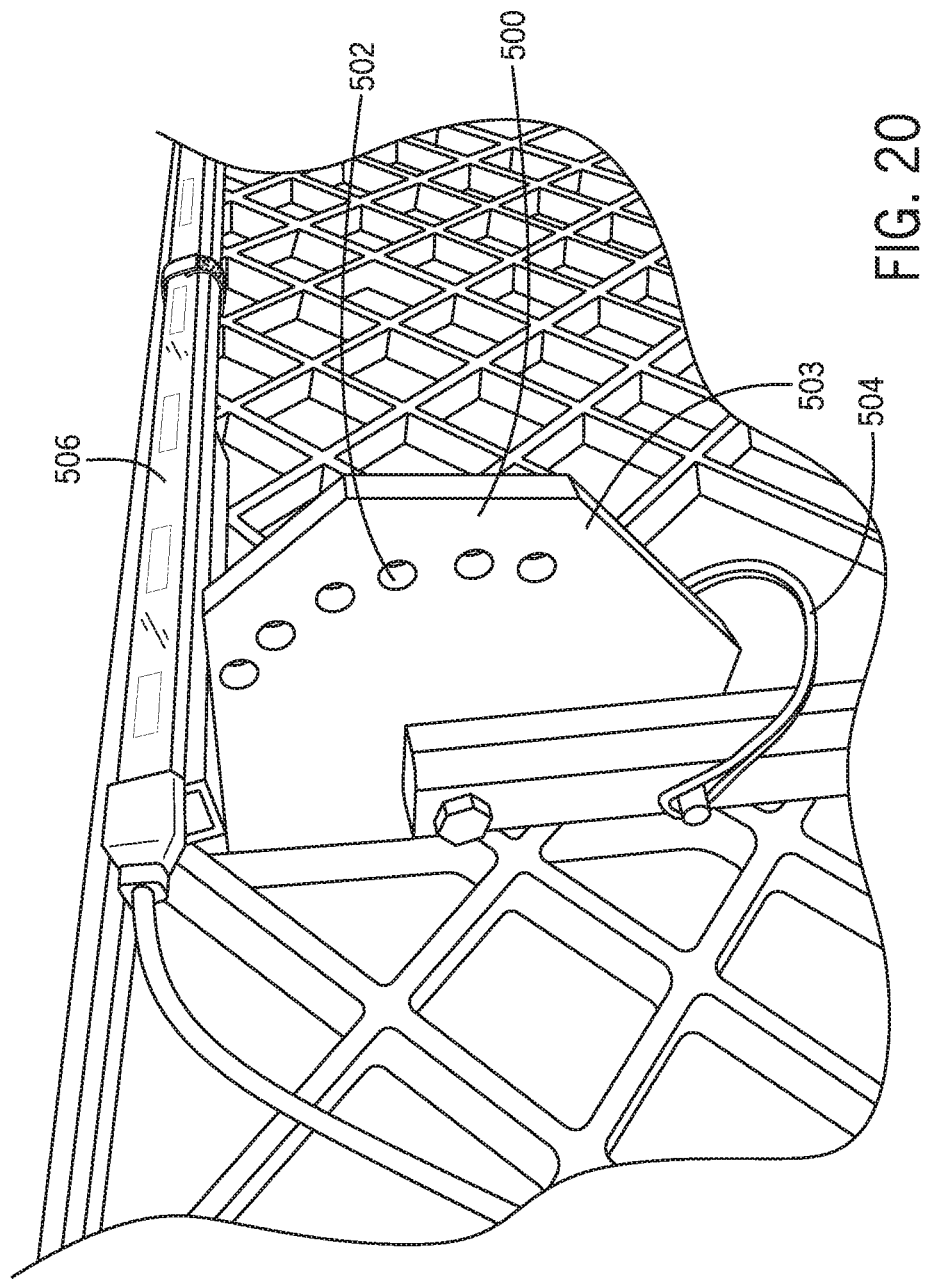
FIG. 20 illustrates an isometric enlarged view of a bracket assembly for supporting a boom for the spray demonstration kit.
Figure 21:
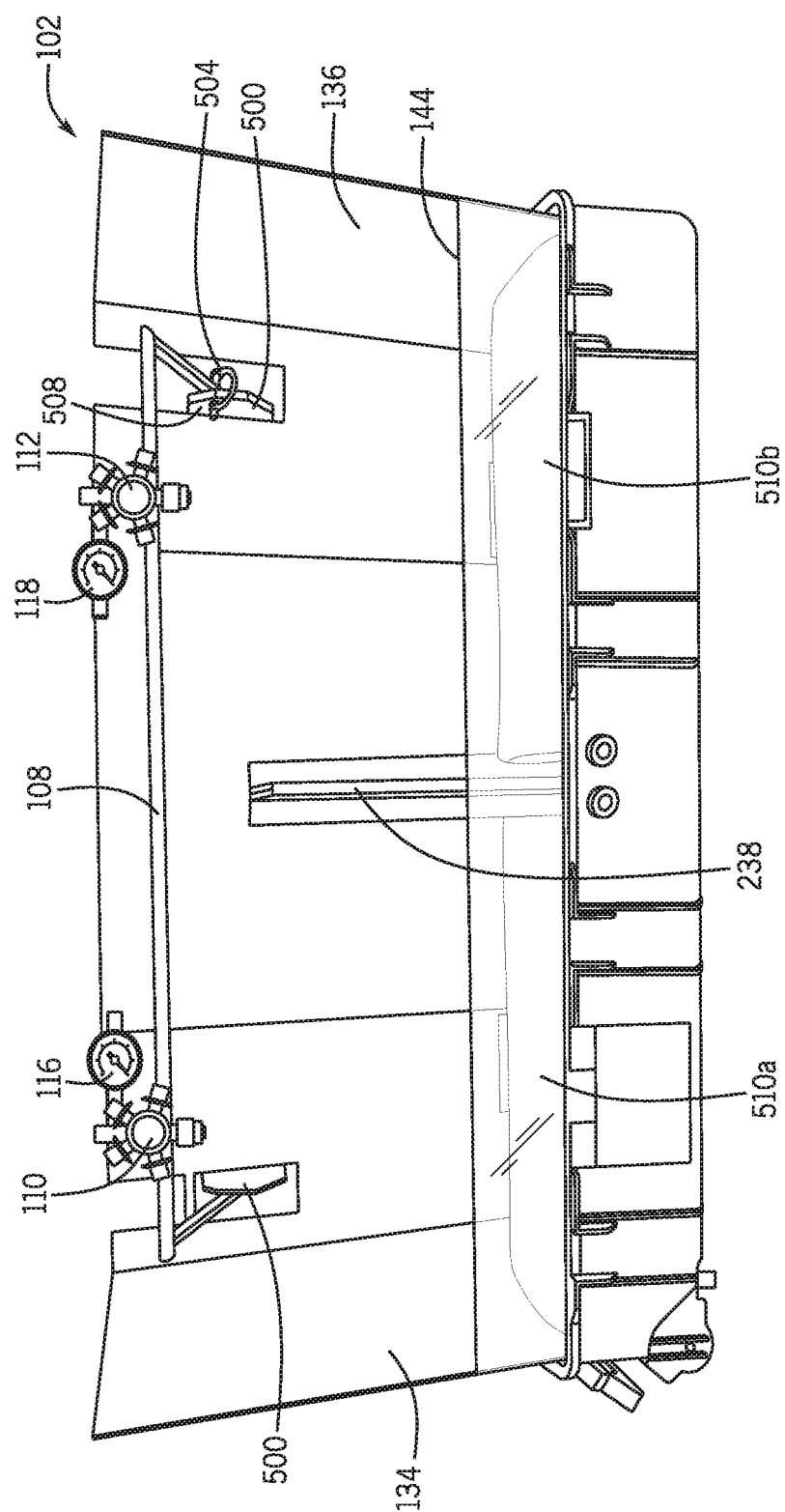
FIG. 21 illustrates a front elevation view of the spray demonstration kit of FIG. 20.

In some embodiments, an adjustable bracket may be used to secure the boom 108 in a desired position. FIG. 20 illustrates an isometric enlarged view of a bracket assembly 500 for the boom 108. FIG. 21 illustrates a front elevation view of the spray demonstration table of FIG. 20. With reference to FIGS. 20 and 21, the bracket assembly 500 may include a bracket 503 including a plurality of bracket apertures 502 defined therethrough. The bracket assembly 500 also includes a pin 508 (see FIG. 21) and pin cord 504. The pin 508 is secured to the boom 108 by the pin cord 504 and the length of the pin cord 504 allows the pin 508 to be positioned in a number of the bracket apertures 502 so that the boom 108 can be positioned at a variety of positions relative to the bracket 503. For example, the boom 108 may be rotated from a storage position (FIG. 20) to a demonstration position (FIG. 21) and the pin 508 may then be inserted into the corresponding bracket aperture 502 on the bracket body 503 to secure the boom in the desired position relative to the bracket. To rotate the boom 108 to another position, the pin 508 is removed and the boom 108 can then be rotated to another desired position.

The spray demonstration table 102 may also include one or more light sources. For example, as shown in FIG. 20, a light source 506, which may be plurality of LEDs, fluorescent lights, incandescent lights, organic light emitting diodes, or the like. The type of lights within the light source may be varied as desired.

In some embodiments, the spray demonstration table may also include one or more filters 510a, 510. With reference to FIG. 21, a first filter 510a and a second filter 510b may be positioned between the nozzle turrets 110, 112 and the reservoirs. The filters 510a, 510b may be a plastic non-woven filter matrix that may be substantially the same dimensions as the reservoir. The filters 510a, 510b catch overspray and assist in catching fine sprays to better recirculate the fluids in the spray demonstration table.

For example, in one embodiment, the filters 510a, 510b, may each be a rigid polyester filter pad about ½' thick. The filters 510a, 510b may be cut wider than the basin and bent to form an arch front to back such that the majority of the surface remains above the water level. The filters 510a, 510b may be sufficiently rigid to support themselves and stand up on their own. In embodiments where the material is polyester, the polyester is hydrophobic, which is advantageous in shedding water when done to allow for quicker drying. The filters 510a, 510b aid in providing additional texture, facilitating the capture and sequestration of the spray and reducing secondary splatter or overspray.

Control Panel

Figure 22:
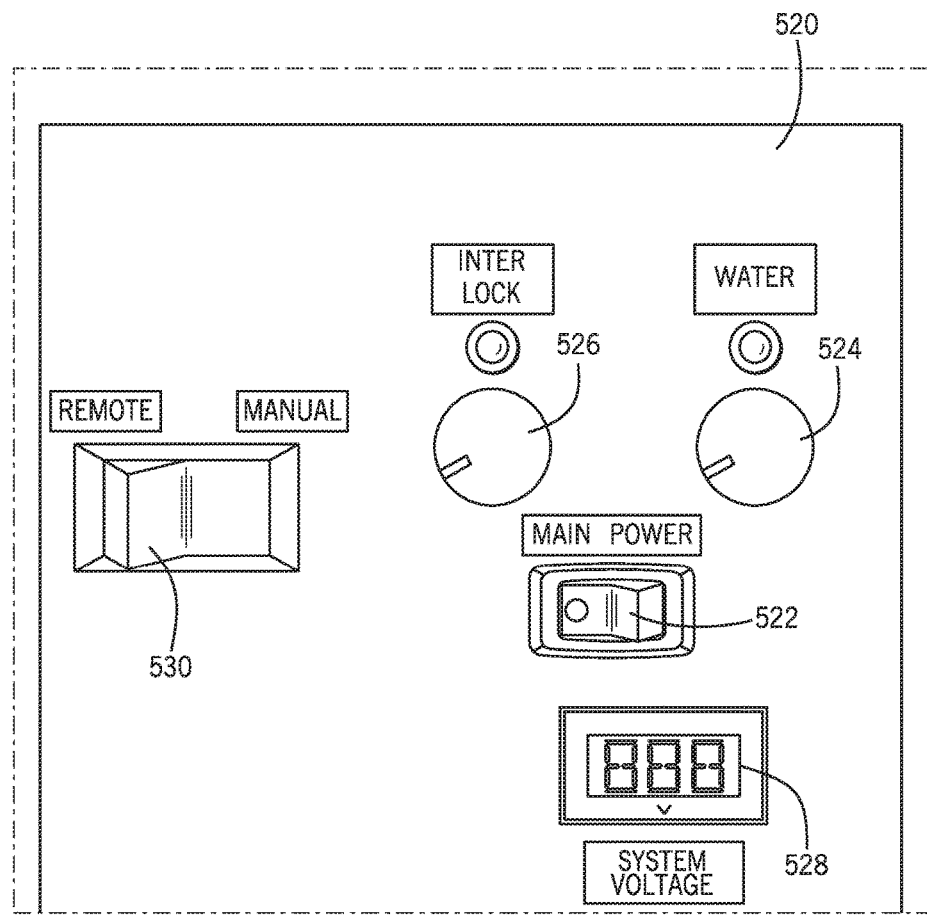
FIG. 22 illustrates a front elevation view of another example of the control panel.

As briefly discussed above, in some embodiments, the control panel 290 may be remotely activated and may be varied from the control panel illustrated in FIG. 15. FIG. 22 illustrates a front elevation view of another example of the control panel. With reference to FIG. 22, in this example, the control panel 520 may include a plurality of control actuators 522, 524, 526, 530. The control actuators 522, 524, 526, 530 may be used to selectively activate or modify one or more components or characteristics of the spray demonstration table. For example, the first control actuator 522 may be used to power on or off the pumps and other components of the spray demonstration table 102. The second and third control actuators 524, 526 may be similar to the control actuators 304, 306 in FIG. 15 and may be used to control the pump speed, torque, or the like to vary the output characteristics of the nozzles. The fourth control actuator 530 may be used to allow manual or remote activation and control of the spray demonstration table 102. For example, pressing the control actuator 530 into the remote position may activate a particular sensor (e.g., IR sensor) that may detect control signals from a remote controller and when remote control is not desired, the control actuator 530 may be pressed into the manual position and the sensor may be turned off. This selective activation of the remote sensor helps to save power when remote control of the spray demonstration table 102 is not desired. Also in some embodiments, such as the one shown in FIG. 22, the control panel 520 may include a display 528 for displaying data or other information about the spray demonstration table 102. In FIG. 22, the display 528 is an electronic display (e.g., light emitting diode, liquid crystal, or the like) that displays the voltage consumed by the system. However, other types of information may be displayed if desired, some examples include, time running, flow rate through each of the nozzles, pump speed, fluid pressure through the nozzles, or the like.

It should be noted that in the embodiment shown in FIG. 22, the control panel 520 does not include the reservoir hoses 260, 262. In this embodiment, the reservoir hoses 260, 262 enter the pump system through the rear of the control panel 520. This provides a more aesthetically pleasing interface for the user and also helps to reduce the potential for a user to inadvertently remove one of the hoses 260, 262 while selecting or moving one of the control actuators.

CONCLUSION

Although the present disclosure has been described with a certain degree of particularity, it is understood the disclosure has been made by way of example, and changes in detail or structure may be made without departing from the spirit of the disclosure as defined in the appended claims.

All directional references (e.g., upper, lower, upward, downward, left, right, leftward, rightward, top, bottom, above, below, vertical, horizontal, clockwise, and counter-clockwise) are only used for identification purposes to aid the reader's understanding of the examples of the invention, and do not create limitations, particularly as to the position, orientation, or use of the invention unless specifically set forth in the claims. Joinder references (e.g., attached, coupled, connected, joined and the like) are to be construed broadly and may include intermediate members between the connection of elements and relative movement between elements. As such, joinder references do not necessarily infer that two elements are directly connected and in fixed relation to each other.

In some instances, components are described by reference to "ends" having a particular characteristic and/or being connected with another part. However, those skilled in the art will recognize that the present invention is not limited to components which terminate immediately beyond their point of connection with other parts. Thus the term "end" should be broadly interpreted, in a manner that includes areas adjacent rearward, forward of or otherwise near the terminus of a particular element, link, component, part, member or the like. In methodologies directly or indirectly set forth herein, various steps and operations are described in one possible order of operation but those skilled in the art will recognize the steps and operation may be rearranged, replaced or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A demonstration kit comprising:
   a spray assembly comprising:
     a case having a base and a cover rotatably coupled to the base;
     a plurality of back wall panels configured to be secured to a sidewall of the base;
     a boom connected to an interior surface of the case; and
     one or more nozzles connected to the boom and repositionable along a length of the boom;
   a control assembly comprising an electrical input; and
   at least one pump that when in an operating orientation is fluidly connected to the one or more nozzles.

2. The demonstration kit of claim 1, wherein the at least one pump comprises a first pump and a second pump.

3. The demonstration kit of claim 1, wherein the plurality of back wall panels are a corrugated plastic material.

4. The demonstration kit of claim 1, wherein the kit can be assembled by hand without tools.

5. The demonstration kit of claim 1, wherein the at least one pump is controlled by a pulse width modulation signal.

6. The demonstration kit of claim 1, wherein the control assembly further comprises a dampening assembly to dampen pulses in the fluid pumped by the at least one pump.

7. The demonstration kit of claim 6, wherein the dampening assembly comprises a plurality of elastomeric tubes connected between an outlet of the at least one pump and the one or more nozzles, wherein a length of the elastomeric tubes corresponds to the dampening provided by the dampening assembly.

8. The demonstration kit of claim 1, wherein the one or more nozzles are movable along the length of a nozzle support rod and radially repositionable about an axis thereof.

9. The demonstration kit of claim 1, wherein the boom is rotatably coupled to the cover such that the boom is configured to rotate between a collapsed position, where the boom is positioned within a cavity defined by the cover, and an extended position, where the boom is positioned above a top edge of the cover.

10. A spray pattern demonstration system comprising:
    a control case, comprising:
      an electrical input;
      a control panel in electrical communication with the electrical input; and
      a first pump in electrical communication with the control panel and the electrical input; and
    a spray case in selective fluid and electrical communication with the control case, comprising:
      a nozzle support rod;
      a plurality of nozzles positioned along a length of the nozzle support rod; and
      a first reservoir in selective fluid communication with the first pump.

11. The system of claim 10, wherein during operation the first pump pumps fluid from the reservoir to the plurality of nozzles.

12. The system of claim 10, wherein the spray case further comprises a fluid drain path fluidly connecting the nozzles to the reservoir, wherein during operation fluid is recirculated within the system.

13. The system of claim 10, wherein
    the control case further comprises a second pump in electrical communication with the control panel and the electrical input; and
    the spray case further comprises a second reservoir in selective communication with the second pump; wherein
    the first reservoir and the second reservoir are fluidly separated from each other; and
    the first pump and the second pump are independently controlled by the control panel.

14. The system of claim 10, wherein the electrical input is configured to receive a direct current supply that has an operating voltage of about 12 volts.

15. The system of claim 10, wherein the control panel varies one or more characteristics of the first pump via a pulse width modulation signal provided to the first pump.

16. The system of claim 10, wherein the first reservoir is formed integrally with the spray case.

17. The system of claim 16, wherein the first reservoir comprises at least one drainage area.

18. The system of claim 16, further comprising a divider connected to the control case, wherein the divider defines the first fluid reservoir and a second fluid reservoir.

19. The system of claim 18, wherein the divider is formed integrally with the control case.

20. The system of claim 18, wherein the divider is removable from the control case.

* * * * *